(12) United States Patent
Liu et al.

(10) Patent No.: US 7,483,487 B2
(45) Date of Patent: Jan. 27, 2009

(54) STREAMING METHODS AND SYSTEMS

(75) Inventors: Tianming Liu, Hunan Province (CN); Hong-Jiang Zhang, Beijing (CN); Wei Qi, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 1729 days.

(21) Appl. No.: 10/121,333

(22) Filed: Apr. 11, 2002

(65) Prior Publication Data

US 2003/0195977 A1 Oct. 16, 2003

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................. 375/240.11
(58) Field of Classification Search .................... None
See application file for complete search history.

(56) References Cited

U.S. PATENT DOCUMENTS 6,337,881 B1 * 1/2002 Chaddha ................ 375/240.16
7,095,782 B1 * 8/2006 Cohen et al. ........... 375/240.01
2002/0071485 A1 * 6/2002 Caglar et al. ........... 375/240.01
2002/0114391 A1 * 8/2002 Yagasaki et al. ........ 375/240.14
2002/0122598 A1 * 9/2002 Ribas-Corbera et al. .... 382/239
2003/0016752 A1 * 1/2003 Dolbear et al. ......... 375/240.16
2004/0252901 A1 * 12/2004 Klein Gunnewiek et al. .................... 382/240

FOREIGN PATENT DOCUMENTS

JP 11-317252 * 11/1999

* cited by examiner

*Primary Examiner*—Nhon T Diep
(74) *Attorney, Agent, or Firm*—Lee & Hayes, PLLC

(57) ABSTRACT

Various embodiments provide methods and systems for streaming data that can facilitate streaming during bandwidth fluctuations in a manner that can enhance the user experience. In one aspect, a forward-shifting technique is utilized to buffer data that is to be streamed, e.g. an enhancement layer in a FGS stream. Various techniques can drop layers actively when bandwidth is constant. The saved bandwidth can then be used to pre-stream enhancement layer portions. In another aspect, a content-aware decision can be made as to how to drop enhancement layers when bandwidth decreases. During periods of decreasing bandwidth, if a video segment does not contain important content, the enhancement layers will be dropped to keep the forward-shifting of the enhancement layer unchanged. If the enhancement layer does contain important content, it will be transmitted later when bandwidth increases.

15 Claims, 21 Drawing Sheets

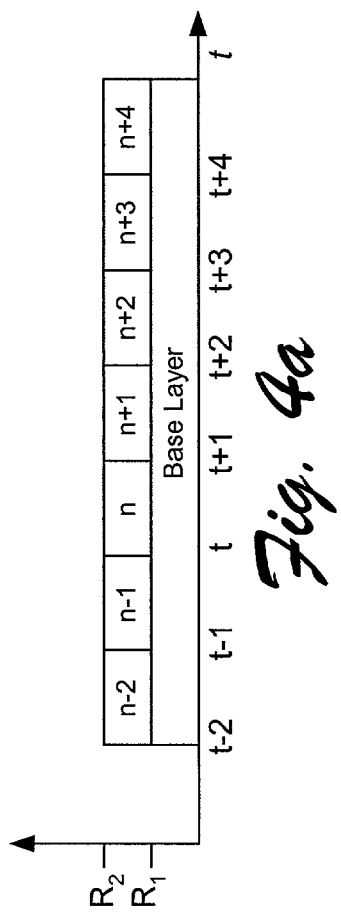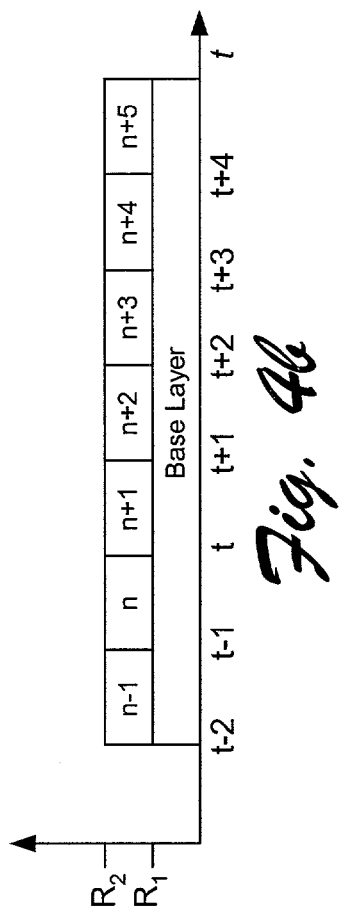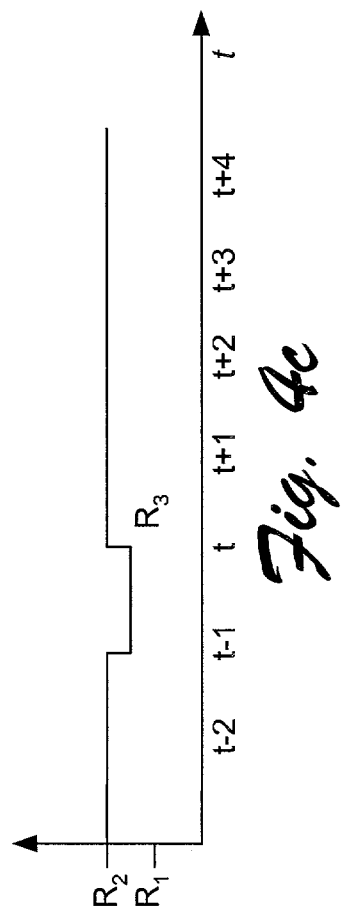

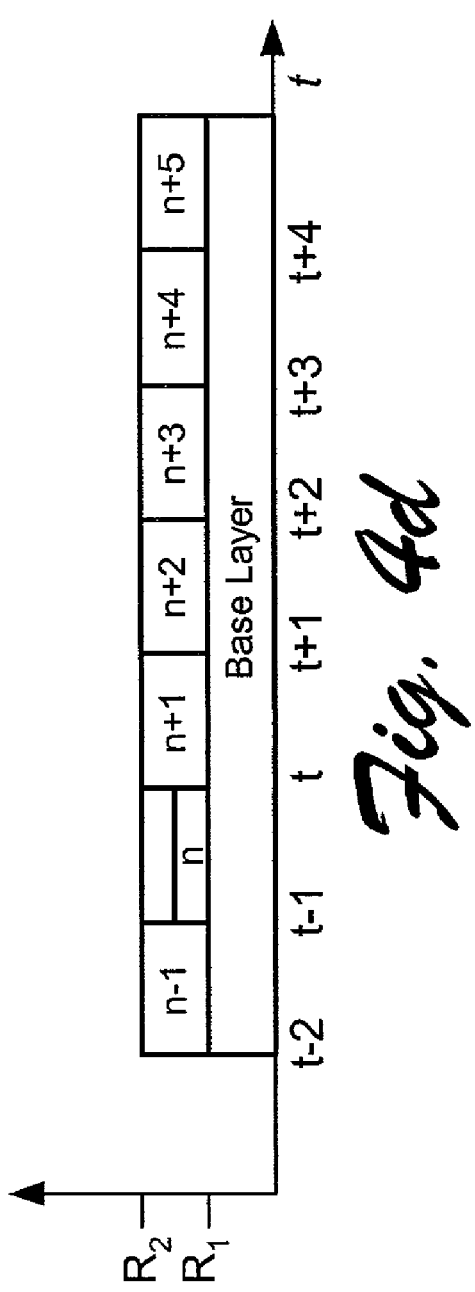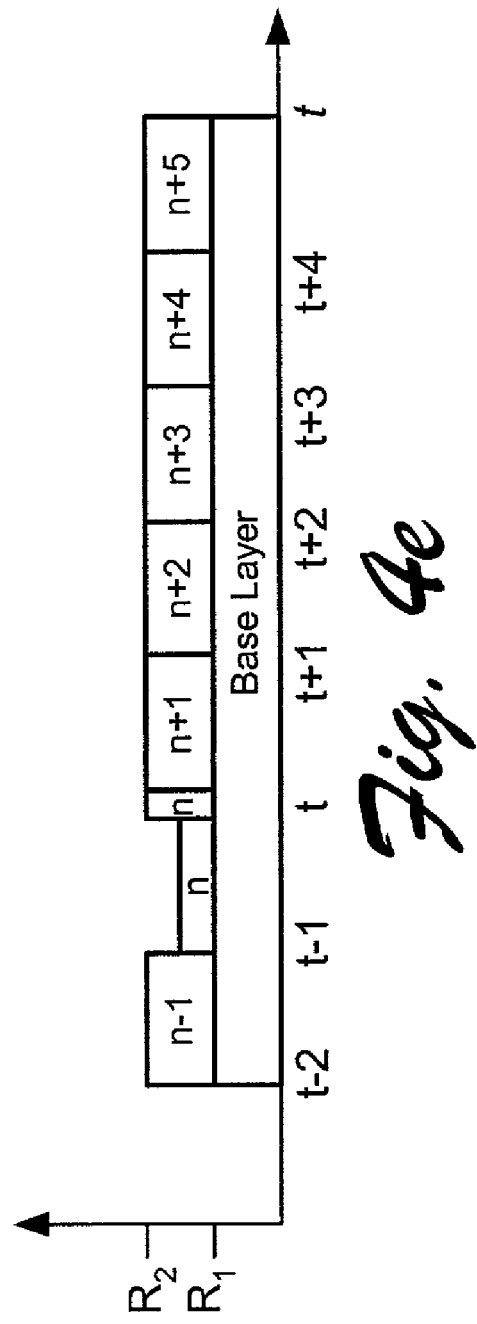

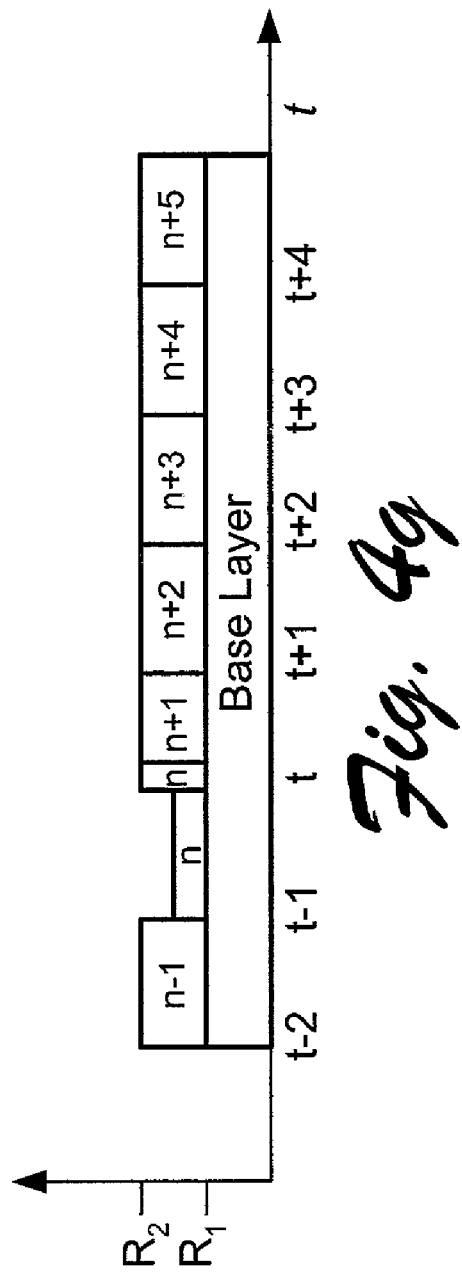
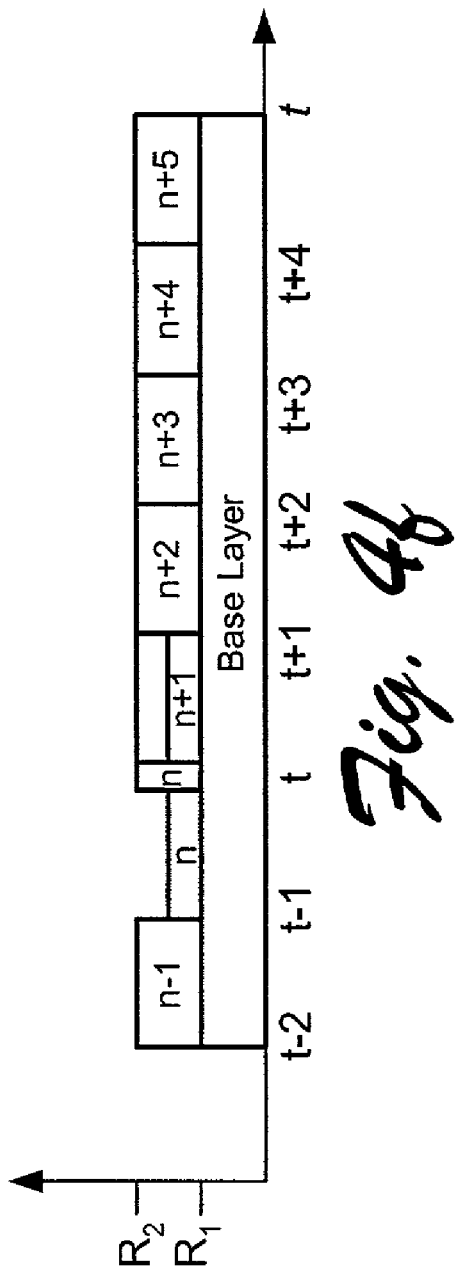
Fig. 4g
Fig. 4h

Individual Triangle Patterns

Splitting Boundary

Splitting Boundary

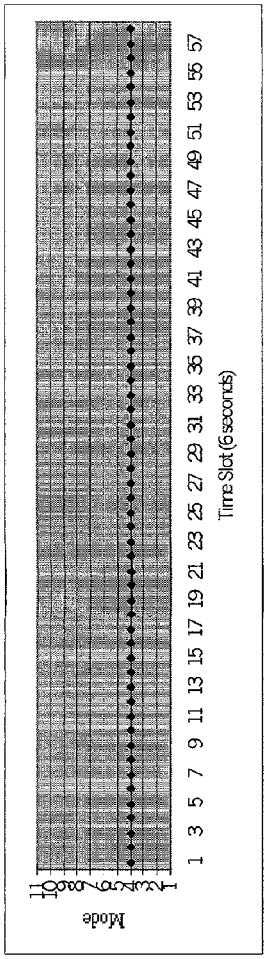
Fig. 18a - Mode
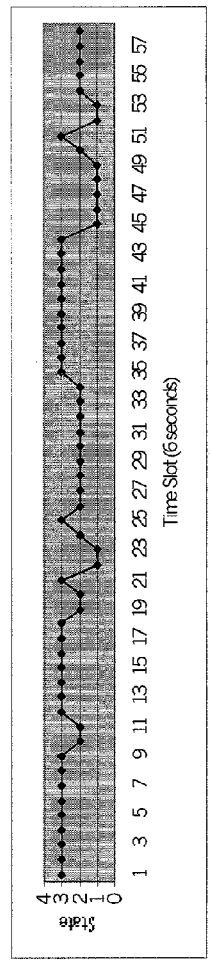
Fig. 18b - State
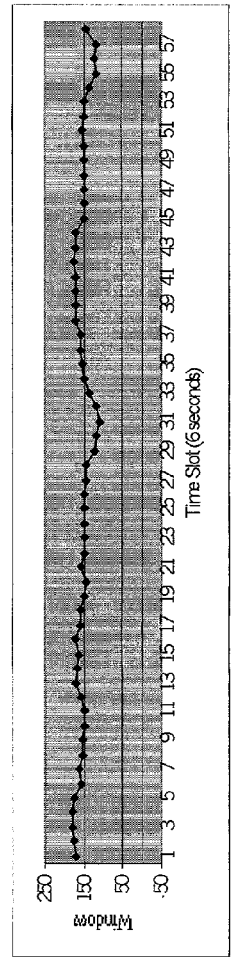
Fig. 18c - Window Size

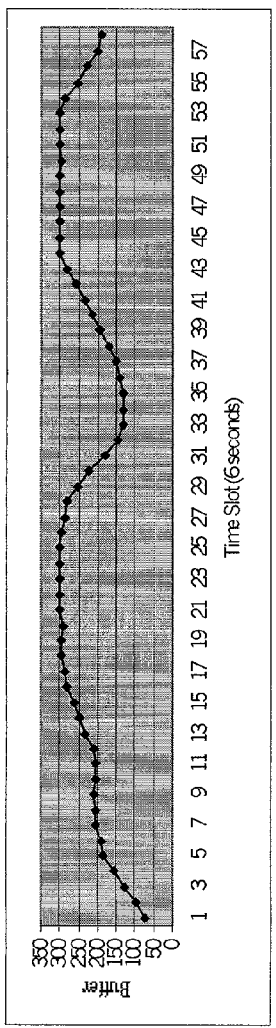
Fig. 18d - Buffer Fullness
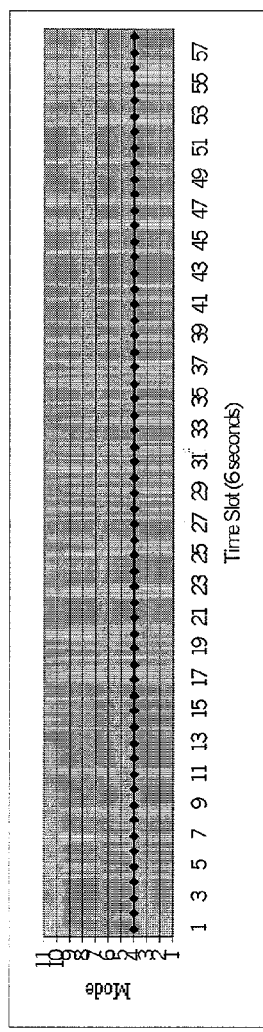
Fig. 19a - Mode
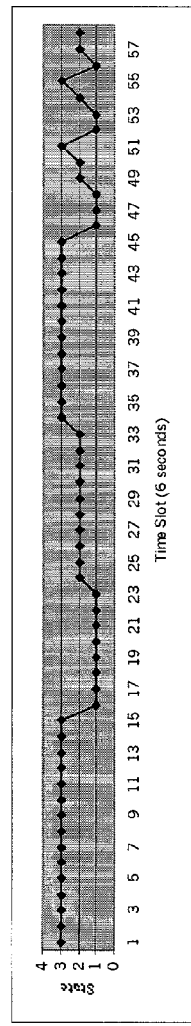
Fig. 19b - State

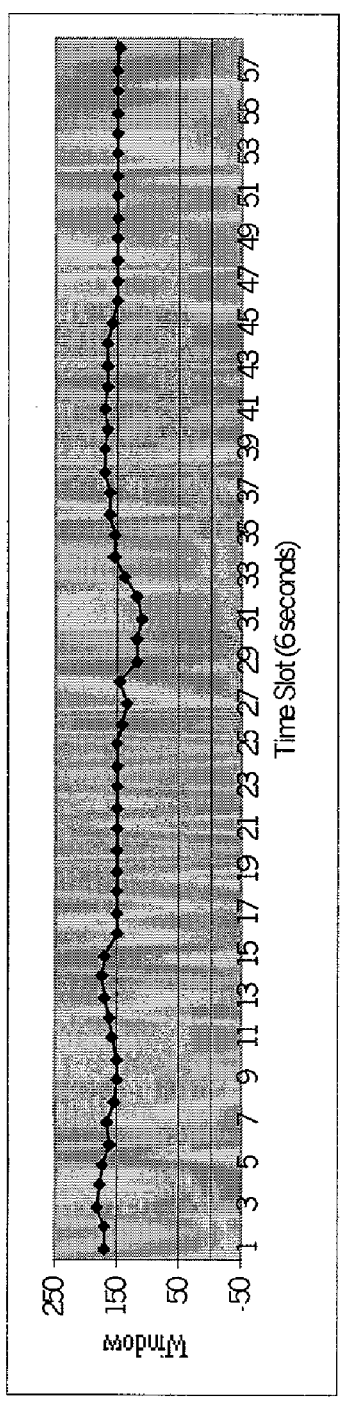
Fig. 19c - Window Size
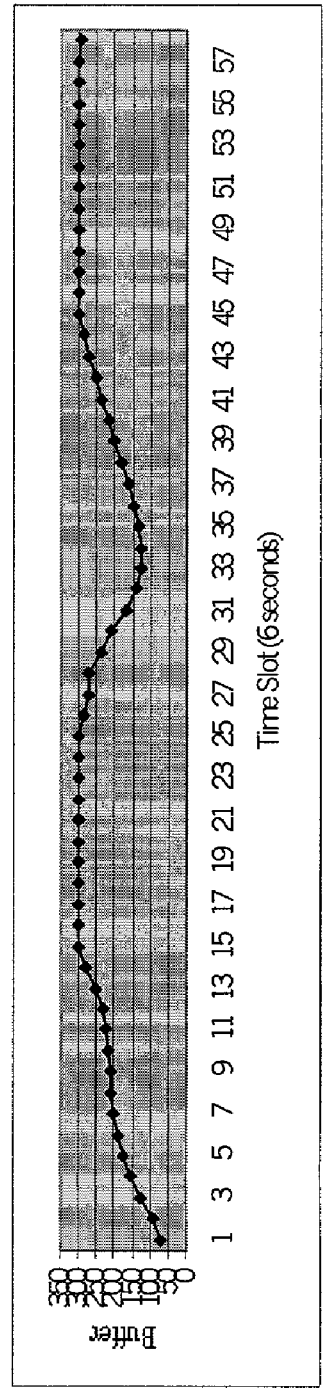
Fig. 19d - Buffer Fullness

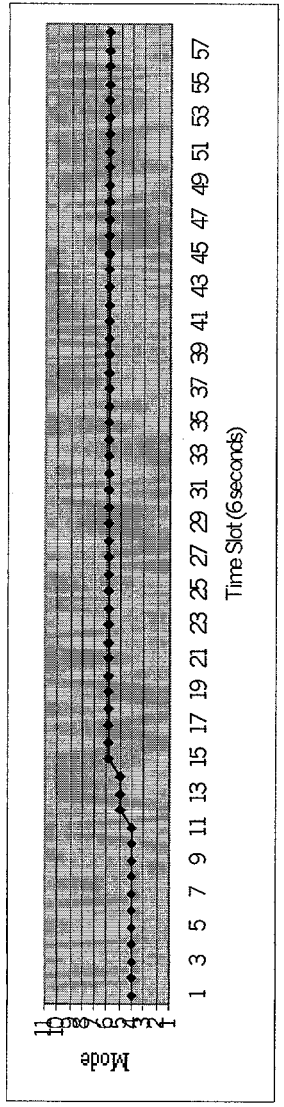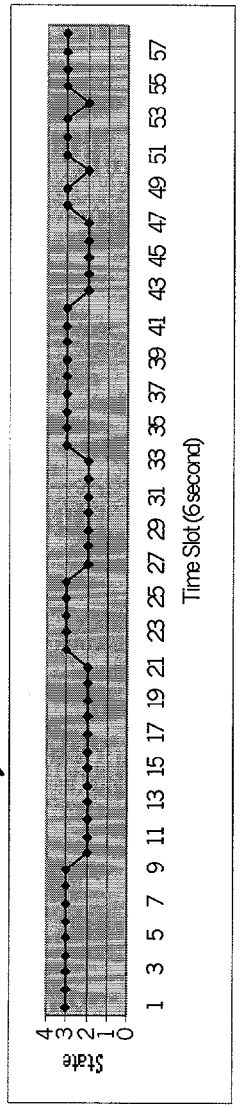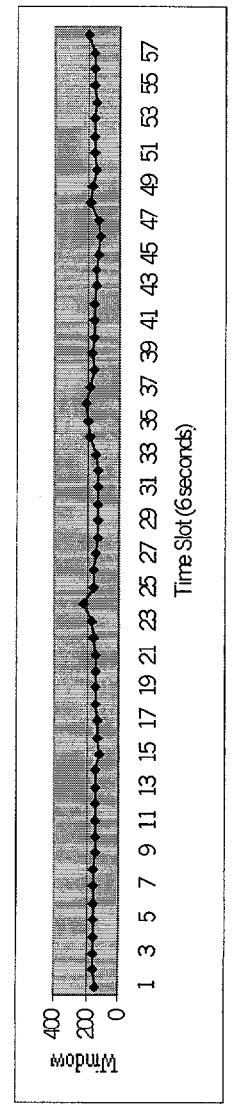
Fig. 20a - Mode    Fig. 20b - State    Fig. 20c - Window Size

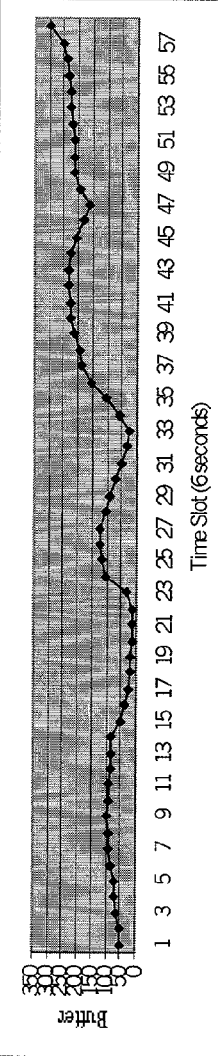
Fig. 20d - Buffer Fullness
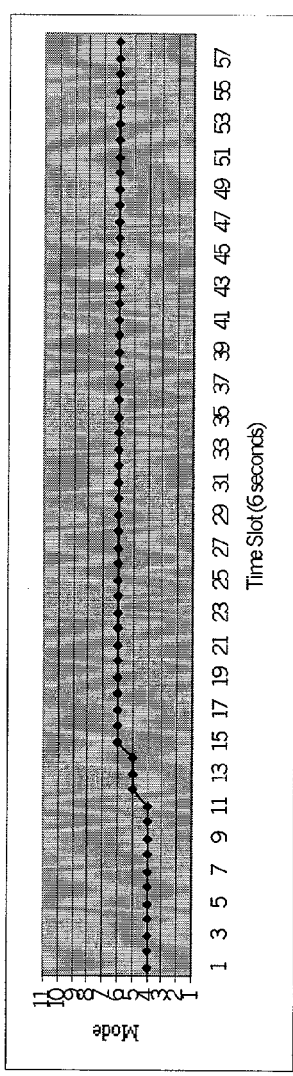
Fig. 21a - Mode
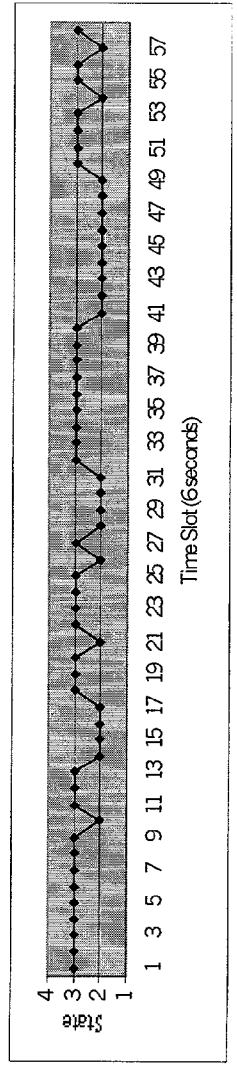
Fig. 21b - State

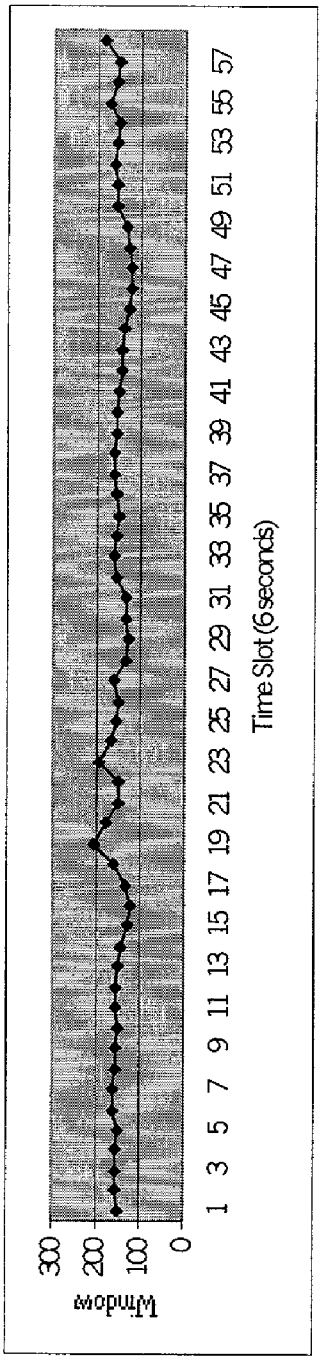
Fig. 21c - Window Size
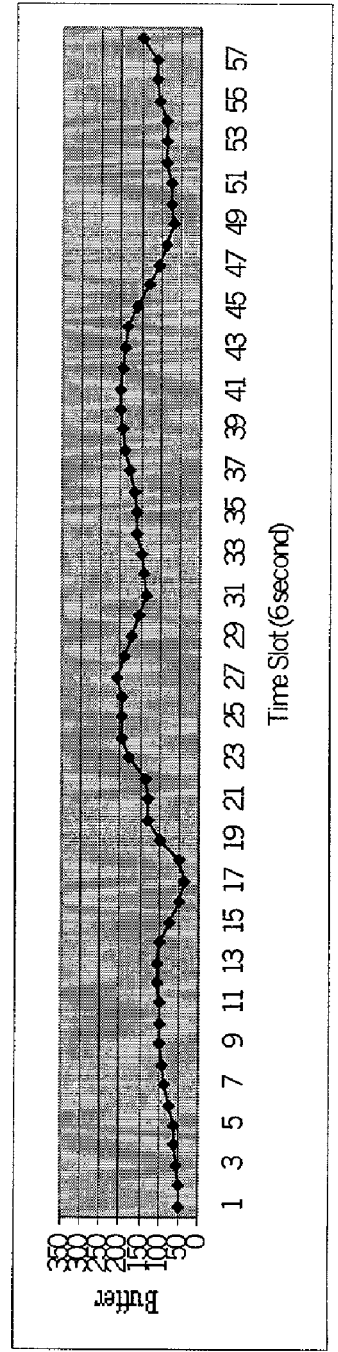
Fig. 21d - Buffer Fullness

STREAMING METHODS AND SYSTEMS

TECHNICAL FIELD

This invention relates to data streaming methods and systems and, in particular, to scalable video streaming methods and systems.

BACKGROUND

Many scalable video-coding approaches have been proposed over the past few years for real-time Internet applications. In addition, several video scalability approaches have been adopted by video compression standards such as MPEG-2, MPEG-4, and H.26x. Temporal, spatial, and quality (SNR) scalability types have been defined in these standards.

All of these types of scalable video consist of a so-called base layer and one or multiple enhancement layers. The base layer part of the scalable video stream represents, in general, the minimum amount of data needed for decoding that stream. The enhancement layer part of the stream represents additional information, and therefore it enhances the video signal representation when decoded by a receiver. For each type of video scalability, a certain scalability structure is used. The scalability structure defines the relationship among the pictures of the base-layer and the pictures of the enhancement layer.

Another type of scalability, which has been primarily used for coding still images, is fine granular scalability (FGS). Images coded with this type of scalability can be decoded progressively. In other words, the decoder can start decoding and displaying the image after receiving a very small amount of data. As more data is received, the quality of the decoded image is progressively enhanced until the complete information is received, decoded, and displayed.

The FGS encoding framework provides a good balance between coding-efficiency and a very simple scalability structure. As shown in FIG. 1, the FGS structure consists of two layers: a base-layer coded at a bitrate $R_{BL}$ and an enhancement-layer coded using a fine-granular (or embedded) scheme to a maximum bitrate of $R_{max}$. FIG. 1 shows examples of the FGS scalability structure at the encoder (left), streaming server (center), and decoder (right) for a typical unicast Internet streaming application. The top and bottom rows of the figure represent base-layers without and with Bi-directional (B) frames, respectively.

This structure provides a very efficient, yet simple, level of abstraction between the encoding and streaming processes. The encoder only needs to encode the video as a base layer and an enhancement layer, and it does not need to be aware of the particular bitrate at which the content will be streamed. The streaming server, on the other hand, has a total flexibility in sending any desired portion of any enhancement layer frame (in parallel with the corresponding base layer picture), without the need for performing complicated real-time transcoding algorithms. This enables the server to handle a very large number of unicast streaming sessions, and to adapt to their bandwidth variations in real-time. On the receiver side, the FGS framework adds a small amount of complexity and memory requirements to any standard motion-compensation based video decoder. These advantages of the FGS framework are achieved while maintaining rather surprisingly good coding-efficiency results.

One of the problems that continue to present itself in the context of streaming application is that of limited and/or fluctuating bandwidth. That is, as congested networks such as the Internet continue to find wide and varied use, bandwidth can become limited and can fluctuate during periods of higher and lower usage. The sending rate of video stream has to be adjusted accordingly. As a result, "jittering" can be very annoying to most video viewers. Accordingly, streaming vendors such as video vendors endeavor to provide constant or smooth quality. Due to the burstiness of video streams and bandwidth fluctuations of the transmission media, achieving this goal can be very challenging.

FGS coding provides the possibility of adapting a video stream taking into account the available bandwidth. However, FGS coding scheme itself does not provide for any smoothing techniques when bandwidth decreases sharply. This becomes especially important when consideration is given to the enhancement layers that contain important content in FGS steaming applications. One straightforward utilization of FGS coding in the context of limited bandwidth situations can involve simply dropping portions of the enhancement layer when bandwidth becomes limited in order to decrease the bit rate of the data stream. But, when bandwidth sharply decreases, as is often the case, too much of the enhancement layer can be dropped and there is no way to guarantee the quality of the video. That is, as bandwidth decreases when important content is being streamed, there is no protection scheme to prevent the important content from being dropped.

Accordingly, this invention arose out of concerns associated with providing improved streaming methods and systems. In particular, this invention arose out of concerns associated with providing methods and systems for scalable streaming.

SUMMARY

Various embodiments provide methods and systems for streaming data that can facilitate streaming during bandwidth fluctuations in a manner that can enhance the user experience. In one aspect, a forward-shifting technique is utilized to buffer data that is to be streamed, e.g. an enhancement layer in a FGS stream. To forward-shift the video stream, unimportant enhancement layers are actively dropped when bandwidth is constant. The saved bandwidth can then be used to pre-stream following stream portions. It is to be appreciated and understood that the base layer is guaranteed to be delivered as bandwidth is sufficient to transmit the very low bit rate base layer. In another aspect, a content-aware decision can be made as to how to drop enhancement layers when bandwidth decreases. During periods of decreasing bandwidth, if a video segment does not contain important content, the enhancement layers will be dropped to keep the forward-shifting of the enhancement layer unchanged. If the enhancement layer does contain important content, it will be transmitted later when bandwidth increases.

BRIEF DESCRIPTION OF THE DRAWINGS

FIGS. 4a-g are diagrams that can assist in understanding aspects of a forward-shifting technique in accordance with one embodiment.

FIG. 18 and 19 are diagrams that show behaviors of an exemplary state machine in accordance with one bandwidth curve.

FIGS. 20 and 21 are diagrams that show behaviors of an exemplary state machine in accordance with another bandwidth curve.

DETAILED DESCRIPTION

Overview

Figure 1:
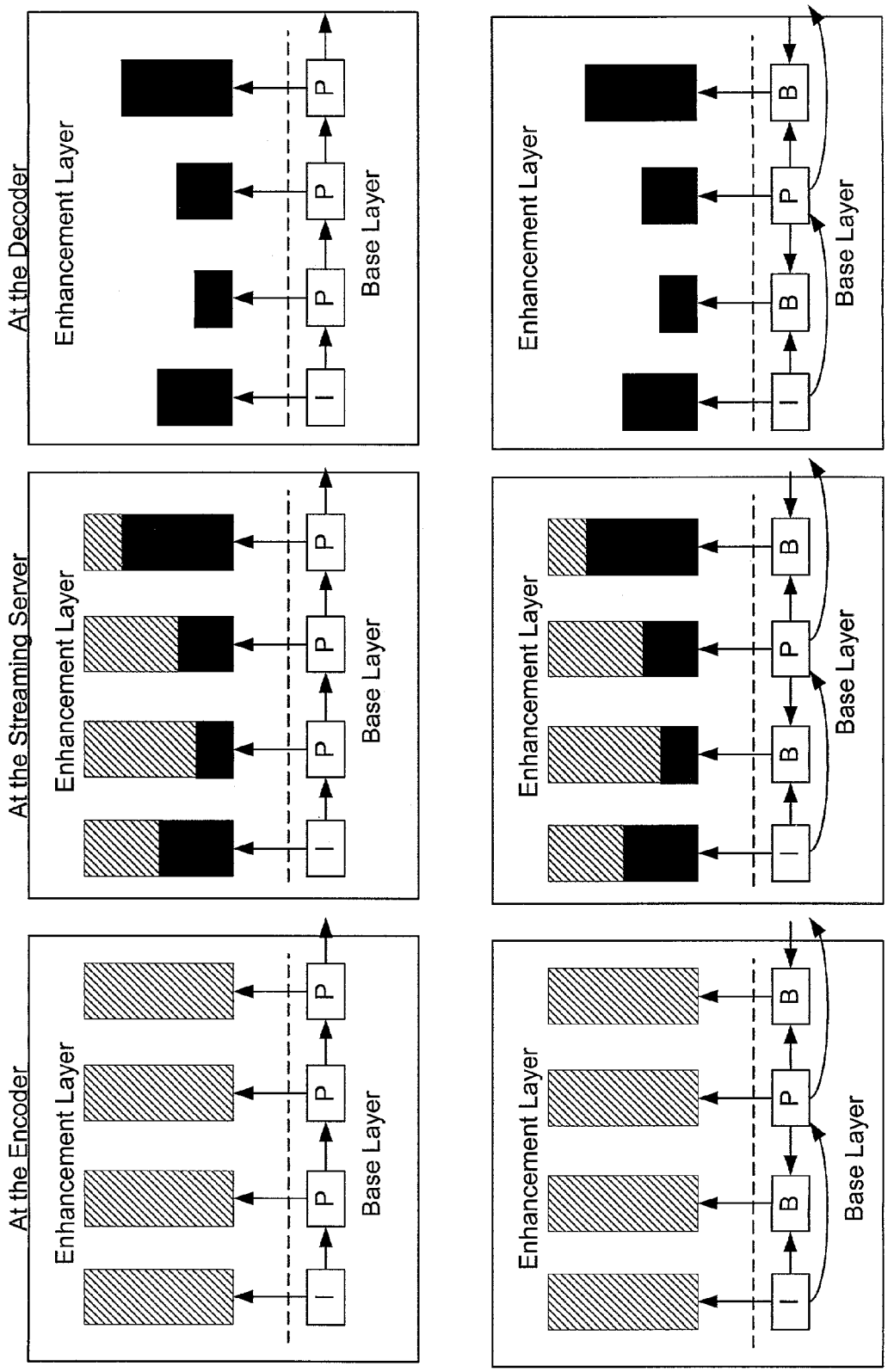
FIG. 1 is a diagram that describes one specific FGS video streaming example, and is useful for understanding one or more of the inventive embodiments described herein.

The embodiments described below provide methods and systems for streaming data that can facilitate streaming during bandwidth fluctuations in a manner that can enhance the user experience. In one particular embodiment described below, various inventive techniques are described in the context of FGS coding. It is to be appreciated, however, that the FGS environment constitutes but one exemplary implementation and such is not intended to limit application of the claimed subject matter only to FGS systems, except when specifically claimed.

In various embodiments, the shifting or processing of the layers can take place continuously thus ensuring, to a great degree, that when bandwidth fluctuates, the client does not undesirably experience a degradation in streaming quality. The amount of forward-shifting can advantageously be determined by the size of the client side buffer into which the content is forward-shifted. The size of the client side buffer can be selected and designed to accommodate the duration of the drop in network bandwidth. Optimal or desirable buffer sizes can be statistically determined taking into account bandwidth reduction duration times. For example, network bandwidth typically fluctuates for a determinable amount of time (e.g. 0.5-10 seconds). This fluctuation duration can be used as a guide for size of the client buffer.

One of the advantages of continuously attempting to forward shift the layers is that layers can be built up on the client side so that if there is a fluctuation in network bandwidth, the quality on the client side is not seriously degraded. As discussed below, the importance of the content can be ascertained. This can facilitate the forward-shifting process by enabling content that is determined to be important to be more actively forward-shifted when network bandwidth is available. Similarly, when network bandwidth drops, the forward-shifting of the layers can be adjusted to ensure that content that is determined to be unimportant is not meaningfully forward shifted. Thus, various embodiments can provide techniques that determine the importance of the content and then make decisions to forward shift layers in accordance with fluctuations in network bandwidth and the content's importance. When content is important and network bandwidth is available, then the layers can be more actively forward shifted. When the content is unimportant and network bandwidth drops, the forward-shifting can be less active or inactive.

In one aspect, a forward-shifting technique is utilized to buffer the enhancement layer. Instead of dropping layers passively when bandwidth decreases, unimportant enhancement layers are actively dropped when bandwidth is constant. The saved bandwidth can then be used to pre-stream enhancement layer portions. As a result, the whole enhancement layer can be shifted forward by a certain amount of bits. This provides chances for content-aware decisions when bandwidth decreases. The forward-shifting technique is, in some respects, like a bridge between FGS coding and content analysis. It is to be appreciated and understood that the base layer is guaranteed to be delivered as bandwidth is sufficient to transmit the very low bit rate base layer.

In another aspect, a content-aware decision can be made as to how to drop enhancement layers when bandwidth decreases. During periods of decreasing bandwidth, if the video segment does not contain important content, the enhancement layers will be dropped to keep the forward-shifting of the enhancement layer unchanged. If the enhancement layer does contain important content, it will be transmitted later when bandwidth increases. The forward-shifted bits can help to guarantee that the clients will not suffer from buffer underflow. In this way, important content can be protected. If the bandwidth is constant, more bits of important layers are transmitted and some high layers of unimportant layers are dropped to make room for important layers. Content can be analyzed online or offline as various embodiments are in the scenario of streaming stored video.

Exemplary Computer Environment

Figure 2:
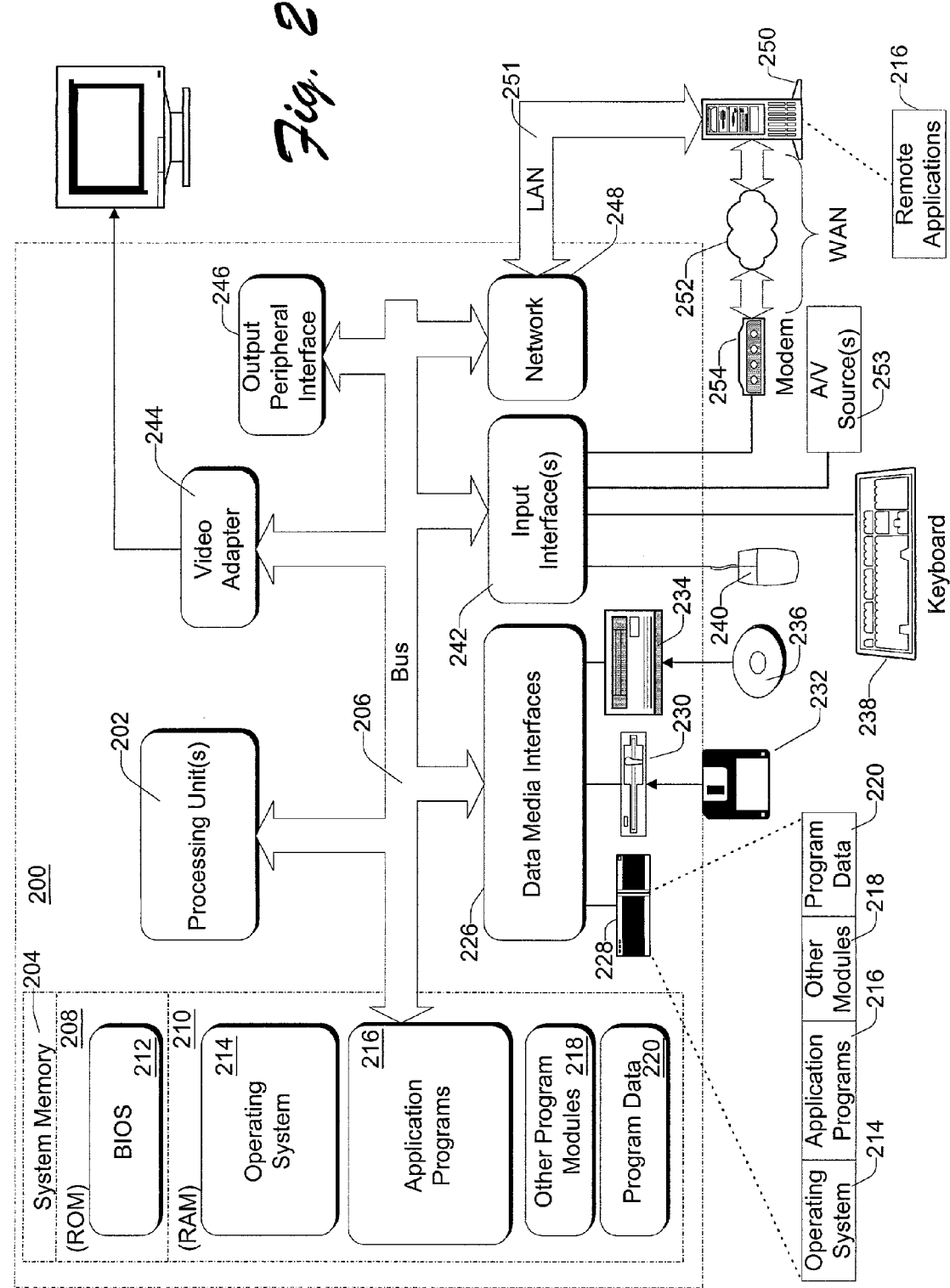
FIG. 2 is a block diagram of an exemplary computer system that can be utilized to implement one or more embodiments.

FIG. 2 illustrates an example of a suitable computing environment 200 on which the system and related methods for processing media content may be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The media processing system is operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The media processing system may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2 computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2. computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Exemplary First Embodiment

In the embodiment about to be described, the inventive forward-shifting process and content-aware decision is explained in the context of streaming an FGS stream. It is to be appreciated and understood that the inventive forward-shifting process and content-aware decision can be performed in connection with streaming non-FGS streams, e.g. MPEG-1 video stream, and that the FGS-specific description is given, for among other reasons, to illustrate to the reader one specific context in which the inventive process can be employed. The forward-shifting process can also be used for streaming spatially, temporally, and SNR scalable video defined in MPEG-2, MPEG-4, and H.26L.

Server Initialization

Figure 3A:
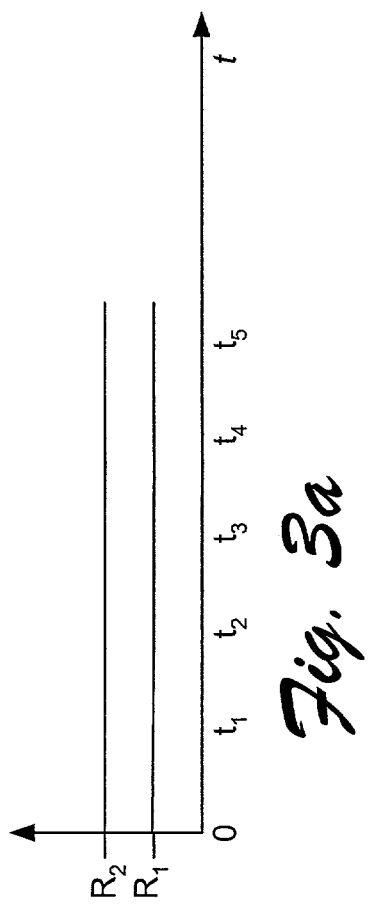
FIGS. 3a-c are diagrams that can assist in understanding aspects of a forward-shifting technique in accordance with one embodiment.
Figure 3B:
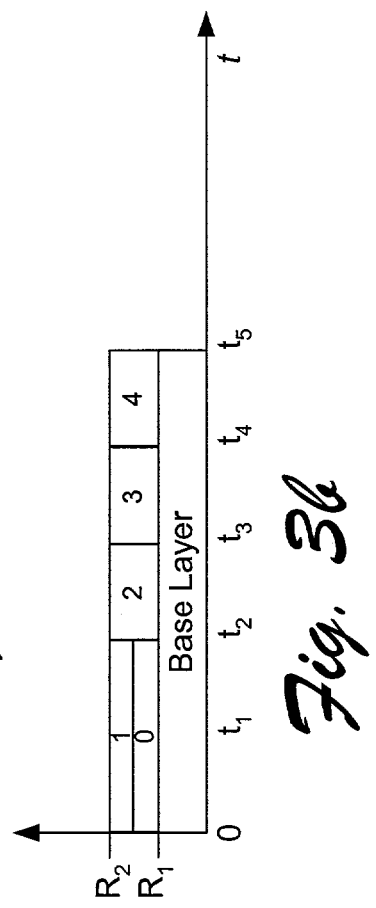

Before streaming of the FGS stream, an initialization process is performed so that the streaming server can begin streaming an initially forward-shifted enhancement layer, and thus forward-shift the whole video stream. For the sake of clarity, it is assumed that available bandwidth is constant during the initialization process. This is diagrammatically shown in FIG. 3a, where $R_1$ represents the bit rate of the base layer, and $R_2-R_1$ represents the bit rate of the enhancement layer. Additionally, both base layer and enhancement layer are assumed to be CBR (Constant Bit Rate) streams. Representative base and enhancement layers are indicated in FIG. 3b. Further, it is to be appreciated that in the illustrated FGS stream, multiple enhancement layers are supported. In this particular enhancement layer embodiment, lower layers of the enhancement layer are deemed more important than higher layers of the enhancement layer. That is, the enhancement layer is encoded using bit-plane DCT. Accordingly, low layers represent more important bit-plane and thus are more important.

In the illustrated example, the bits stream of the enhancement layer is divided into individual blocks. Each block has the same amount of bits. The time scale and exact number of bits of each block is typically specified in particular applications.

Figure 3C:
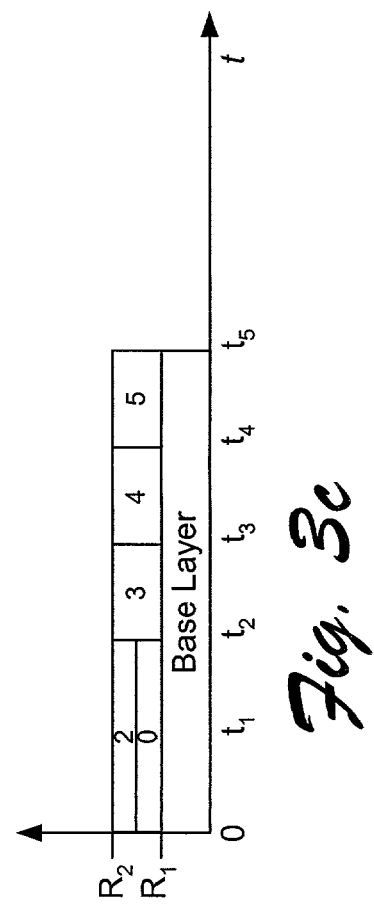

At the beginning of the FGS video streaming, a first block is dropped to enable the enhancement layer to be forward shifted. Thus the whole video stream is forward shifted as the base layer is guaranteed to be delivered. In this particular example, block 1 is always dropped. The saved bandwidth is then used to transmit block 2. This is diagrammatically shown in FIG. 3*c* where block 2 is depicted in the space that was previously occupied by block 1. Accordingly, after the transmission of block 0 and block 2, block 3 will be transmitted from time $t_2$. As a result, the FGS enhancement layer is shifted forward by a block size from $t_2$ on. This is apparent when a comparison is made between FIGS. 3*b* and 3*c*. Notice that in FIG. 3*b*, block 3 is transmitted at time $t_3$. In FIG. 3*c*, however, block 3 is transmitted at time $t_2$. Since the dropped bits of block 1 are in the high layers of the enhancement layer, the video quality will not be severely degraded.

At this point in the process, the server initialization process is complete and has produced a forward-shifted enhancement layer. This forward-shifted enhancement layer provides a buffer for bandwidth decreases that might be experienced in the future.

Content-aware Layer Dropping

In the discussion that follows, a content-aware decision-making process is described that enables intelligent decisions to be made as to how to drop enhancement layer portions when bandwidth decreases occur. Essentially, during periods of decreased bandwidth, if the video segment does not contain important content, portions of the enhancement layers can be dropped to keep the forward-shifting of the enhancement layer unchanged. If the video segment does contain important content, then the enhancement layer will be transmitted later, when bandwidth increases. The forward-shifted bits can, in many instances, guarantee that the clients will not suffer from buffer underflow. In this way, important content is protected and the overall video quality is smoothed. If the bandwidth is constant, more bits of important layers are transmitted and some high layers of unimportant layers are dropped to make room for important layers.

As an example, consider the following. At best, network bandwidth, such as the bandwidth of the Internet, varies commonly and randomly. When bandwidth decreases, the FGS video server inevitably has to drop some layers. The described forward-shifting technique makes it possible to selectively drop layers so that layers with important content can be protected, and more unimportant layers can be dropped. That is, when bandwidth decreases, the enhancement layer will be transmitted later if it contains important content. Otherwise, if the enhancement layer does not contain important content, some of its layers (or portions thereof) can be dropped.

To illustrate this method more clearly, consider the example presented in FIGS. 4*a*-*g*.

FIG. 4*a* shows an original enhancement layer, which is divided into blocks of equal size. The illustrated enhancement layer comprises blocks n−2 through n+4. FIG. 4*b* shows the forward-shifted stream after the initialization process described above.

Now, assume, as shown in FIG. 4*c*, that the bandwidth decreases to $R_3$ from t−1 to t. As a result, the content importance of block n is now analyzed. It will be appreciated that content analysis can be performed online or offline, as mentioned above. It just so happens that, in this example, content analysis is performed online. Content analysis can be performed using any suitable content analysis algorithms or tools. Exemplary tools will be understood and apparent to those of skill in the art. As but a few examples, content analysis can take place using such things as perception model based or structure model based content analysis. One specific example of how this can be done is given below.

Content analysis enables a determination to be made as to whether or not selected layers of block n are to be dropped. In this example, the content analysis enables a determination to be made as to whether to drop the high layers (i.e. less important layers) of the particular block. If the content of block n is determined not to be important, then the selected high layers of block n are dropped. This is diagrammatically illustrated in FIG. 4*d*.

Thus, the integrity of the forward-shifted enhancement layer is preserved. That is, the forward-shifted enhancement layer remains forward shifted without any changes. If, on the other hand, the content of block n is determined to be important, then following processing can take place.

First, as shown in FIG. 4*e*, transmission of the high layers of block n is delayed somewhat. These layers will be transmitted later when bandwidth increases again. Accordingly, from time t−1 to t, only part of block n is transmitted. It should be pointed out that this will not result in buffer underflow at the client side because sufficient bits have been forward-shifted.

When bandwidth increases at time t, the delayed layers of block n can now be transmitted. The result of this delayed transmission is that the whole enhancement layer is now shifted by half a block. After block n is completely transmitted (i.e. the high layers), the process again seeks to actively drop some unimportant high layers to ensure that the whole enhancement layer is shifted by a block size to prepare for next bandwidth decrease.

This can be accomplished as follows. If any block after block n is determined to be unimportant (as by suitable content analysis), its high layers will be actively dropped. For example, in FIG. 4*f*, assume that block n+1 is determined to be unimportant. Accordingly, high layers of block n+1 are dropped. This results in the enhancement layer being again forward-shifted by a block after t+1. This is diagrammatically shown in FIG. 4*g*. There, by comparison with FIG. 4*f*, block n+2 is to be transmitted at time t+1, rather than some time later as indicated in FIG. 4*f*. At this point, the FGS video server is ready for the next bandwidth decrease.

It is to be appreciated and understood that the base layer is guaranteed to be delivered and the receiver (on the client end) can synchronize the transmitted enhancement layer and base layer. This forward-shifting technique does not require extra client buffering or extra delay.

It should be pointed out that this embodiment permits the block sizes to be different, and that the time scales of bandwidth decrease can vary. This flexibility comes both from flexible bit-dropping permitted by FGS, and from the shifting mechanism of the described embodiment. An accurate network bandwidth model can further be helpful, but the described embodiment does not depend on a network bandwidth model. If the bandwidth decreases severely and prestreamed bits are insufficient, dropping low layers of the enhancement layer may become inevitable.

Thus, in this embodiment, based on FGS coding, two advantageous contributions are made to solve problems associated with decreasing bandwidth. First, a forward-shifting technique facilitates buffering the enhancement layer and thus the whole stream. Instead of dropping layers passively when bandwidth decreases, the described embodiment can drop layers actively when bandwidth is constant. The saved bandwidth is then used to pre-stream later portions of the enhancement layer. As a result, the whole enhancement layer is shifted forward by a certain amount of bits. Second, content-aware decisions can be made as to how to drop enhancement layers when bandwidth decreases. Because the described embodiment is not dependent on any one particular method of analyzing content, flexible solutions can be provided for accommodating various different ways of analyzing content.

Figure 5:
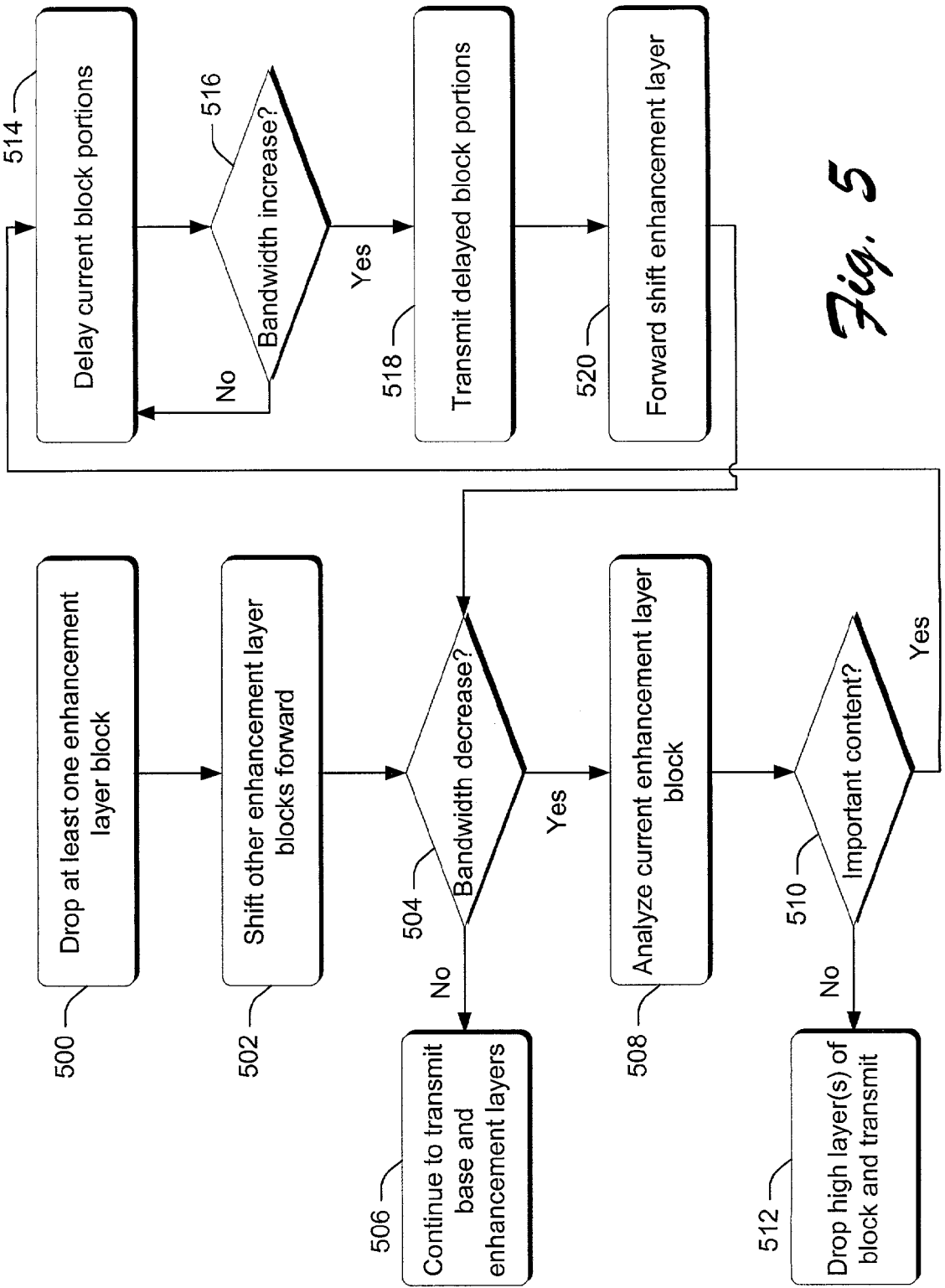
FIG. 5 is a flow diagram that describes steps in a method in accordance with one embodiment.

FIG. 5 is a flow diagram that describes steps in a method in accordance with one embodiment. The steps can be implemented in any suitable hardware, software, firmware, or combination thereof. In the illustrated example, the steps can be implemented by a suitably programmed streaming server.

Step 500 drops at least one enhancement layer block and step 502 shifts following enhancement layer blocks forward. These two steps desirably initialize the streaming server so as to forward shift the enhancement layer in anticipation of a bandwidth decrease. The base layer is also transmitted at the initialization step because enhancement layer can not be decoded without base layer. The server can now start streaming following base and enhancement layers. One specific example of how this can be done is given above.

Step 504 determines whether there has been a decrease in the available bandwidth. If there is no bandwidth decrease, then step 506 continues to transmit base and enhancement layers. If, on the other hand, there is a bandwidth decrease, then step 508 analyzes the current enhancement layer block. Analysis of the current block can take place by analyzing the content of the current video segment to which the block belongs. Various content analysis techniques can be used, with but a few examples being given above. In addition, step 508 can be performed on line (i.e. during streaming) or offline (prior to streaming). If, at step 510, the current enhancement layer block is determined to not be important, then step 512 drops one or more high layers of the block and continues transmission. This step is directed to preserving the forward-shifted enhancement layer. If, on the other hand, step 510 determines that the content of the current enhancement layer block is important, then step 514 delays transmission of current block portions. Step 516 determines whether bandwidth has increased. If not, the step returns to step 514 and continues monitoring bandwidth for an increase. If the bandwidth has increased, then step 518 transmits the previously-delayed block portions. Step 520 then forward shifts the enhancement layer again by actively dropping some unimportant high layers. The method is now ready for another bandwidth decrease and can return to step 504.

The embodiment just described provides a new content-aware video streaming method that can advantageously enhance the user experience. In but one implementation, the method can be employed to stream FGS streams. The method can go a long way toward ensuring a desirable level of video quality when network bandwidth decreases sharply.

Perceptual Temporal Video Adaptation Techniques

Dropping B frames (i.e. bi-directionally predictive-coded frames) is one of the major techniques for rate adaptation to bandwidth decreases in video streaming applications. Yet, how to maximize user satisfaction when dropping B frames continues to be an open area for exploration and improvement. Dropping frames will cause motion judder since the dropped frames usually are replaced by replaying previous frames. The reason that one sees judder after frame dropping is that human eye and brain are trying to track the smooth motion of moving objects. That is, when a frame is repeated, one's brain will usually be confused and does a double take. This is the perceived motion judder and is very annoying to viewers. In fact, a viewer's perceived motion judder and his/her satisfaction to frame dropping heavily depends on the motion in video sequence. That is, frame dropping with different motion patterns will result in different levels of user satisfaction.

From the sampling theorem point of view, dropping frames means decreasing temporal sampling rate that possibly results in temporal aliasing. Hence, dropping frames of lower temporal frequency is preferable to dropping frames of higher temporal frequency. In most of video systems today, dropping frames means repeating previous frames, which will result in motion judder. It is found that frame repetition gives good results where no motion is present, but fails in moving areas, resulting in clearly visible motion judder in frame rate up-conversion applications. Actually, dropping frames with camera pan motion is more annoying than dropping frames with other kinds of motion as motion judder is most noticeable on camera pans in video. Therefore, to model user satisfaction to frame dropping, the low-level motion description feature should embody such characteristics of human perception. The closer to human perception characteristics a motion description is, the more accurate the learned model will be. In this invention various described embodiments, a low-level feature named PME (Perceived Motion Energy) is introduced to describe motion intensity in video sequences.

In the embodiments described below, user satisfaction to B frame dropping is modeled using two inventive MMS-PC (Mean MOS Score-PME Class) models to predict user satisfaction by low-level motion features. In the models, video motion is described in a way that the motion feature is highly correlated with user satisfaction to frame rate decrease. Video sequences are separated into successive segments using the motion feature, and video segments are classified by the motion feature. Learning from large MOS (Mean Opinion Score) test results, video segments are classified into several classes, and two models that map these segment classes to user satisfaction to two typical frame rate decreases are obtained. High correlation between prediction by the models and real MOS test results enable construction of a priority-based model to describe which frames are important to human perception and which frames are not. As a result, the video adaptation scheme can be based on the priority-based delivery model to protect frames that are more important to viewers' perception.

The forward-shifting technique and content-aware decision-making, which are described in the FGS video streaming environment, are utilized in the perceptual temporal video adaptation scheme. A state machine is provided to implement the adaptation scheme. The state of the state machine transits to absorb short-term bandwidth or bit-rate variations, and the mode of the state machine transits to adapt to long-term bandwidth or bit-rate variations. The state of the state machine is determined by client buffer occupancy, available bandwidth, and the priorities and sizes of current frames. The mode of the state machine is decided by the bit rate of the stream and average bandwidth.

MMS-PC Models

Because of the frame interdependency in MPEG, dropping P frames or dropping I frames will result in very annoying motion judder even when the motion is slow. Accordingly, the described embodiments focus on B frame dropping. Two typical dropping percentages, that is, 50% and 100%, are used to obtain two degraded frame rates of original video sequences.

To human perception, dropping frames of low motion intensity is less perceptible than dropping frames of high motion intensity. Dropping frames with camera pan motion is more annoying than dropping frames with other kinds of motion. Accordingly, low-level feature for motion description should embody such characteristics of human perception to motion. The closer to human perception characteristics motion description is, the more accurate the learned model will be. In the embodiment described below, a low-level feature designated "PME" for "perceived motion energy" is introduced, and a model is developed to separate video sequences into segments according to PME values. In the described embodiment, the developed model is a triangle model, as will become apparent below.

Video viewers are the ultimate judges of video quality. Given this, the described models learn from video viewers by learning the results of a large number of MOS tests. In the described embodiment, the DCR (Degradation Category Rating—ITU-T Recommendation P.910) MOS test scheme is utilized. The whole MOS test is divided into independent test sessions. The MMS-PC models learn from the test results by supervised clustering and regression.

Perceived Motion Energy

In an MPEG stream, there are two motion vectors in each macro block of a B-frame for motion compensation, often referred as the "motion vector field" (MVF). Since the magnitude of a motion vector reflects the motion velocity of a macro block, it can be used to compute the energy of motion at frame scale. Although the angle of a motion vector is not reliable to represent the motion direction of a macro block, the spatial consistency of angles of motion vectors reflects the intensity of global motion. The spatial motion consistency can be obtained by calculating the percentage of dominant motion direction in a whole frame. The more consistent the angles are, the higher the intensity of global motion is. The a typical samples in a MVF usually result in inaccurate energy accumulation, so the magnitudes of motion vector in MVF should be revised through a spatial filtering process first before computing perceived motion energy.

The spatial filter used in the described embodiment is a modified median filter. The elements in the filter's window at macro block $MB_{i,j}$ are denoted by $\Omega_{i,j}$ in MVF, where $W_s$ is the width of the window. The filtered magnitude of the motion vector is computed by:

$$Mag_{(i,j)} = \begin{cases} Mag_{i,j} & \text{if } Mag_{i,j} \leq \text{Max } 4th(Mag_k) \\ \text{Max } 4th(Mag_{i,j}) & \text{if } Mag_{i,j} > \text{Max } 4th(Mag_k) \end{cases} \quad (1)$$

where $(k \in \Omega_{i,j})$, and the function Max 4th($Mag_k$) returns the fourth value in the descending sorted list of magnitude elements $\Omega_{i,j}$ in the filter window.

Then the spatially filtered magnitudes at each macro block position (i,j) are averaged by a second filter. The filter adopts an alpha-trimmed filter within a window, with the spatial size of $W_t^2$. All of the magnitudes in the window are sorted first. After the values at two ends of the sorted list are trimmed, the rest of magnitudes are averaged to form mixture energy $MixEn_{i,j}$, which includes the energy of both object and camera motion, denoted by (2).

$$MixEn_{i,j} = \frac{1}{(M - 2 \times \lfloor \alpha M \rfloor \times W_t^2)} \sum_{m=\lfloor \alpha M \rfloor + 1}^{M - \lfloor \alpha M \rfloor} Mag_{i,j}(m) \quad (2)$$

where M is the total number of magnitudes in the window, and $\lfloor \alpha M \rfloor$ equals the largest integer not greater than $\alpha M$; and $Mag_{i,j}(m)$ is the magnitude's value in the sorted list. The trimming parameter $\alpha(0 \leq \alpha \leq 0.5)$ controls the number of data samples excluded from the accumulating computation. Then the average magnitude Mag(t) of motion vectors in the whole frame after the above filtering is calculated as $$Mag(t) = \beta \times (\Sigma MixFEn_{i,j}(t)/N + \Sigma MixBEn_{i,j}(t)/N)/2 \quad (3)$$

Where $MixFEn_{i,j}(t)$ represents forward motion vectors and $MixBEn_{i,j}(t)$ represents backward motion vectors. The definitions of $MixFEn_{i,j}(t)$ and $MixBEn_{i,j}(t)$ are similar to $MixEn_{i,j}$ in Eq. (2). In Eq.(3), N is the number of macro blocks in the frame and $\beta$ is set to 4.54. The percentage of dominant motion direction $\alpha(t)$ is defined as $$\alpha(t) = \frac{\max(AH(t,k), k \in [1,n])}{\sum_{k=1}^{n} AH(t,k)} \quad (4)$$

The angle in $2\pi$ is quantized into n angle ranges. Then number of angles in each range is accumulated over the whole forward motion vectors to form an angle histogram with n bins, denoted by AH(t,k), k∈[1,n]. So max(AH(t,k)) is the dominant direction bin among all motion directions. n is set 16 throughout the work.

The perceived motion energy (PME) of a B frame is computed as follows:

$$PME(t) = Mag(t) \times \alpha(t) \quad (5)$$

The first item on the right side of Eq. 5 is the average magnitude of motion vectors within a frame, which is expected to reflect the fact that dropping frames of low motion intensity is less perceptible than dropping frames of high motion intensity. The second item $\alpha(t)$ represents the percentage of the dominant motion direction. For instance, $\alpha(t)$ will make the contribution of motion from a camera pan more significant to PME, because $\alpha(t)$ will be very large if a camera panning exists. If other camera motions exist or dominant object motions exist, $\alpha(t)$ will also be fairly large as well. This matches the fact that human eyes tend to track dominant motion in the scene. We define the PME feature in a way that is expected to closely embody characteristics of human perception, and this will be proved by the high correlation between the learned MMS-PC models and individual test results

Temporal Segmentation

As stated in the section above, the PME value is calculated for each B frame for a given video as the first step of determining the importance of each B-frame in term of its significance to perceived judder. The range of PME value is cut to [0, 200] as there is are very few PME values larger than 200. Now the PME value sequence PME(t) is used to represent the original video sequence. The next step is to temporally segment this sequence into successive segments, each represented by a triangle model of motion acceleration and deceleration cycle. Before performing this segmentation, PME(t) is filtered by an average filter within a window of 5 frames. This filter smoothes the PME value sequence from noises and makes the segmentation more accurate. Then, a model is used to segment the sequence into successive segments and represent each of the segments. In the illustrated example, the model comprises a triangle model, although other models can be used.

Figure 6:
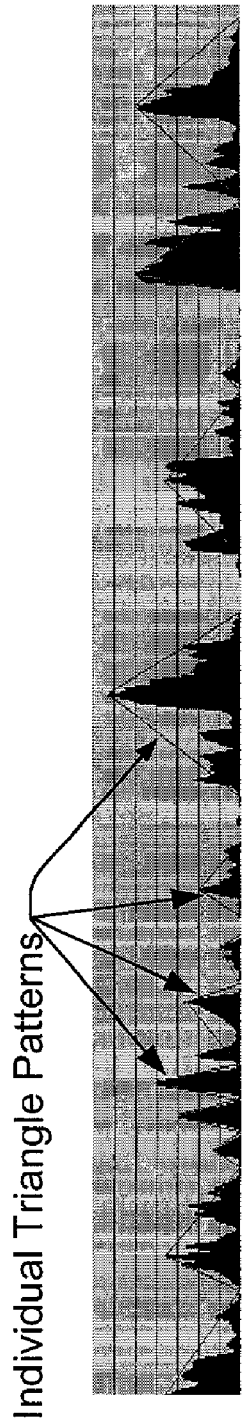
FIGS. 6-8 are diagrams that can assist in understanding processing steps in accordance with one embodiment.

FIG. 6 shows an example. The left bottom vertex of the triangle represents the start point of the segment and its PME value is zero. The right bottom vertex of the triangle represents the end point of the segment and its PME value is also zero. The top vertex of the triangle represents the maximum PME value of the segment. So for segment i, the triangle model is represented by a triple $(ts_i, te_i, PME_i)$, where $ts_i$ is the start point, $te_i$ is the end point, $PME_i$ is the peak PME value of the segment, and $PME(ts_i)=PME(te_i)=0$. A special triangle model $(ts_i, te_i, 0)$ is used for successive zeros.

Use of the triangle model is inspired by the fact that the motion pattern of a typical scene is composed of a motion acceleration process and a following deceleration process. Accordingly, the left bottom vertex represents the start point of motion acceleration and the right bottom vertex represents the end point of motion deceleration. Within video sequences, this motion acceleration and deceleration pattern is repeated over and over again. FIG. 6 clearly shows repeats of the triangle pattern. Extensive experimental results have indicated that the triangle model works well. Of course, it is possible that other models could be used, without departing from the spirit and scope of the claimed subject matter.

Figure 8:
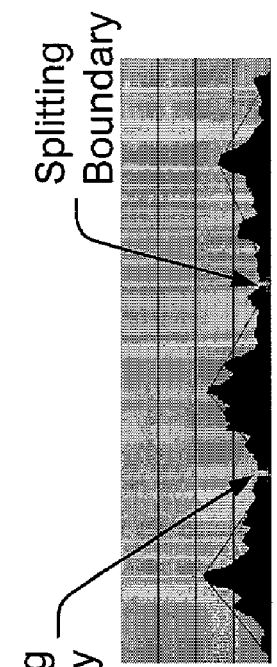
Figure 7:

To segment a sequence, in this embodiment, is to detect triangle patterns in the PME feature of the sequence. The PME value of the start point and that of the end point of a segment are both zero. So a simple search process can be used to find the triangle patterns. However, when motion continues for a long time, the triangle can become less accurate. FIG. 7 shows an example of this situation. To deal with continued motion, a splitting process can be performed before the triangle pattern search process. To split long continuous motion, splitting boundaries can first be found. For a particular point (t, PME(t)), if $$PME(t)=min(PME(t-T), \ldots, PME(t-i), \ldots, PME(t+i), \ldots, PME(t+T)))$$

and $PME(t+j)>0, j \in [-T,T]$ then PME(t) is set 0. So (t, PME(t)) now becomes a spitting boundary. Typically T is set 100 as our statistics show that this value obtains good trade-off between splitting long continuous motion and avoiding too many triangle patterns. That means some local minimums of the PME sequence are set as splitting boundaries. FIG. 8 shows the splitting results of FIG. 7. The two designated blocks show two splitting boundaries, which are local minimums of the original PME sequence. As a result, the large triangle in FIG. 7 is split into three small triangles.

After segmenting a sequence by the triangle model, we need representative features of a video segment to construct models that can predict user satisfaction to frame dropping from these features. We have experimented with two representative features: the peak PME value and the average PME value of a segment. The peak PME value of a video segment is picked as the only representative feature because our experiment results show it is more representative than the average PME value. The effectiveness of the representative feature of peak PME value will be presented in more detail in the model evaluation section.

MOS Test

In the video library utilized to describe this embodiment, the coding type is: MPEG-1 352×288 25 fps CBR 1150 kbps, and the GOP structure is IBBPBBPBBPBBPBBPBB. After dropping 50% and 100% B frames of original sequence, the frame rates of the degraded two sequences, named test sequence 1 and test sequence 2, are 16.7 fps and 8.3 fps respectively. Although the video bit-stream with some frames skipped can be decoded without much of a problem, the frame timing is changed. As a remedy, escape-coded frames can be used instead of skipping where B frames are skipped. Thus frame timing (i.e. frame display timing) is kept unchanged during playback.

In this example, the video library includes 56 original sequences. The total size of the library, including original sequences and test sequences, is about 20 hours. Each original sequence is divided into successive segments logically, but not physically, using the above-described triangle model. There are 7930 original segments and the average segment length is 73. As viewers can hardly distinguish differences if the test segment is too short, only segments longer than 2 seconds are selected as test candidates. In total then, in this example, 2870 test candidates exist in the library. DCR (Degradation Category Rating) was selected as the MOS test scheme. The Degradation Category Rating implies that the test sequences are presented in pairs: the first stimulus presented is always the original sequence, while the second stimulus is the degraded sequence having a lesser frame rate. The degraded sequences in our test are test sequence 1 and test sequence 2 respectively.

The subjects were asked to rate the impairment of test sequence 1 and 2 in relation to the reference. Although many other factors may affect the rating, the testers are instructed to focus on impairment caused by motion judder. The following five-level scale for rating the impairment caused by frame rate decrease is used: 5-Imperceptible, 4-Perceptible but not annoying, 3-Slightly annoying, 2-Annoying, and 1-Very annoying.

The whole test was divided into independent test sessions and each session consisted of 160 segments. The average time of a session was about one hour. Within a session, there are not two segments whose peak PME values are the same, and each segment is randomly selected. Separate tests were performed for the MMS-PC model for the frame rates 8.3 fps and 16.7 fps, respectively. The presentation order of the segments in each session is also random. This randomness attempted to avoid viewer's bias. Twenty viewers attended the test and of a total of 120 sessions, 80 sessions were directed to model learning and 40 sessions were directed to model evaluation. Half of the sessions were for learning and evaluating the MMS-PC model for frame rate 16.7 fps, and another half were for the frame rate 8.3 fps.

The picture rate of CRT monitor of our test PC is set 85 Hz. To interface MPEG video at a low frame rate and the PC display at a high frame rate, image frames have to be repeated at times instances where the original sequence has not be sampled. This frame repetition will cause motion judder in viewing both original segments and degraded segments. However, since we use the Degradation Category Rating MOS test scheme, testers will rate the impairment of degraded segments caused by frame dropping in relation to the original segments Other environments settings are according to the ITU Recommendation P.910.

The MMS-PC Models

Figure 9:
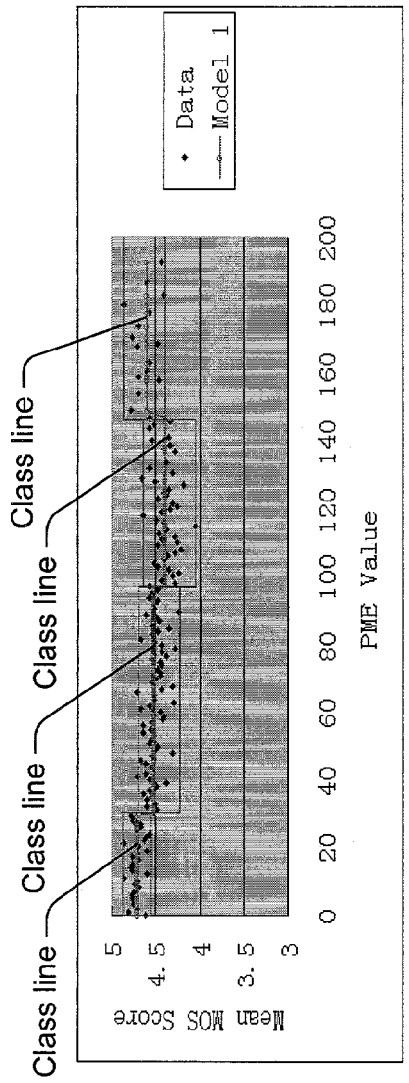
FIGS. 9-11 are diagrams that illustrate aspects of two models in accordance with one embodiment.
Figure 10:
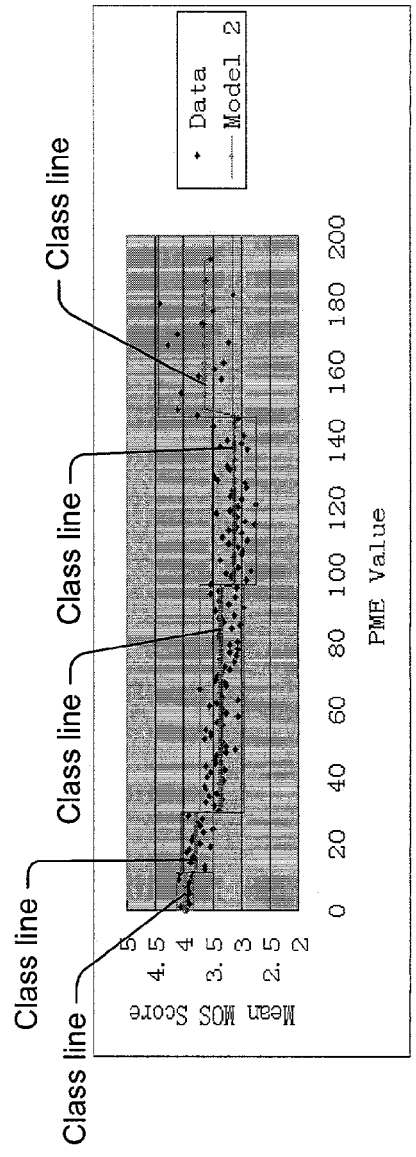
Figure 11:
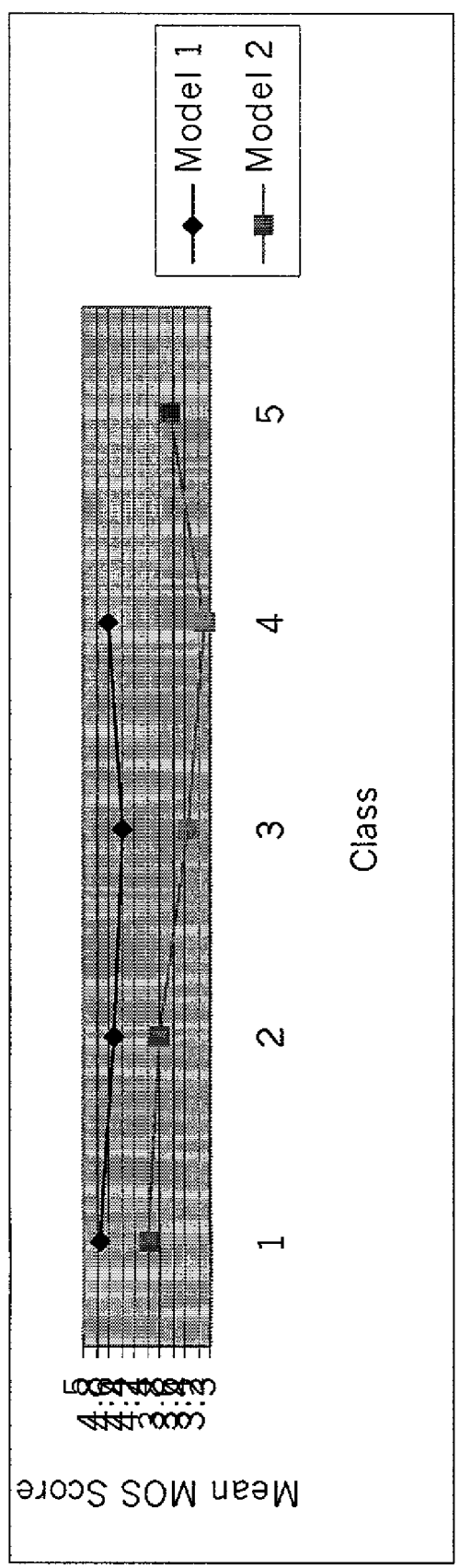

To predict user satisfaction to frame dropping in a video segment, we need to build a model that maps the peak PME value of the segment to a mean MOS score. We have obtained the model through a large number of MOS tests. The mean MOS score for each PME value is obtained by averaging all scores given to the segments with this PME value. The Mean MOS Score-PME Value charts for the frame rates 16.7 fps and 8.3 fps are shown in FIGS. 9 and 10 respectively. Each chart is the prediction model that maps peak PME values to mean MOS scores given a frame rate. To simplify the prediction models and to reflect the human preceived sensitivity to different ranges of motion judder, supervised clustering was used to cluster the points in FIGS. 9 and 10 into classes respectively. A PME class includes a range of PME values, and we use the mean MOS scores of the range of PME values as the mean MOS score of a PME class. For a frame rate of 16.7 fps, four classes are clustered, and for a frame rate 8.3 fps, five classes are clustered. In FIGS. 9 and 10, each indicated block represents a class. A regressed horizontal line (designated "class line") is used to represent each class. The value of the regressed horizontal line is the mean MOS scores of each class. So the combination of the regressed horizontal lines is the learned model. The model for a frame rate of 16.7 fps is designated "model 1" and the model for frame rate 8.3 fps is designated "model 2". The class boundaries and mean MOS score of each class appear in Tables 1 and 2, respectively. FIG. 11 shows the models in another way.

TABLE 1

Mean MOS Scores and Class Boundaries for Model 1

|  | Class 1 | Class 2 | Class 3 | Class 4 |
|---|---|---|---|---|
| Mean MOS Score | 4.717034 | 4.510488 | 4.386745 | 4.594994 |
| Class Boundaries | 0-30 | 31-97 | 98-142 | 143-200 |

TABLE 2

Mean MOS Scores and Class Boundaries for Model 2

|  | Class 1 | Class 2 | Class 3 | Class 4 | Class 5 |
|---|---|---|---|---|---|
| Mean MOS Score | 3.960221 | 3.779262 | 3.342755 | 3.109614 | 3.629562 |
| Class Boundaries | 0-12 | 13-30 | 31-97 | 98-142 | 143-200 |

The human eyes can compensate the scene motion by SPEM. However, the maximum speed of SPEM is about 20 to 30 deg/sec. So, when the motion is faster than this speed, viewers will become less sensitive to frame rate decreases and the scores will increase. In our viewing condition, the viewing distance is about 8H (where H indicates the picture height), and the maximum tracking speed of the human eye is between 20-30 deg/sec. This corresponds to a speed of 26-40 pixels/frame. If all of the motion vectors have the same direction, the corresponding PME value is between 118-191. As a result, the mean score of class 4 is larger than that of class 3 in model 1, and the mean score of class 5 is larger than that of class 4 in model 2.

Based on 20 separate test results, we evaluated the performance of the two MMS-PC models by Pearson correlation coefficient. The average Pearson correlation coefficient between the prediction by model 1 and the real test results is 0.9, and the average Pearson correlation coefficient between the prediction by model 2 and the real test results is 0.95. Such a high correlation between the predictions by the MMS-PC models and real test results indicates that PME feature closely embodies characteristics of human perception to frame dropping which makes the MMS-PC models valid.

A Priority-based Delivery Model

With the MMS-PC models, we developed a priority-based delivery model that describes which frames are more important to human perception. In the described priority-based delivery model, I and P frames are given the highest priority because of decoding interdependency. B frames are assigned priority levels according to their temporal positions and the peak PME values of their segments.

If half of a segment's B frames are dropped, the first of two successive B frames is always dropped first. As a result, the first of any two successive B frames is assigned lower priority levels than the B frames that follow. Dropping one P frame will severely degrade video quality. In various embodiments, we focus on B frame dropping and assign the same priority level to all P frames within a GOP.

Figure 12:
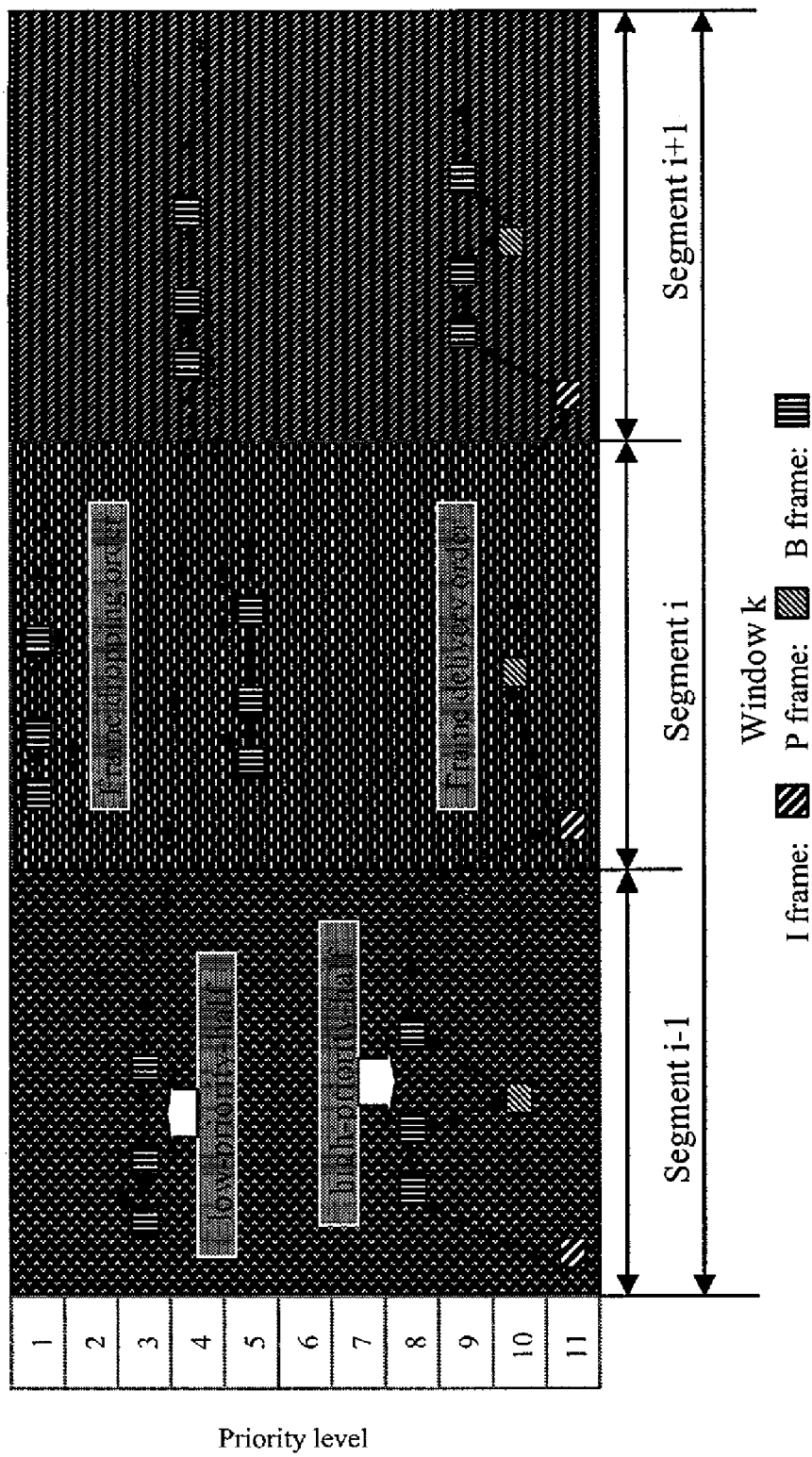
FIG. 12 is a diagram that illustrates an exemplary window in accordance with one embodiment.

FIG. 12 illustrates aspects of a priority-based delivery model. The two halves of B frames of any segment are designated as either a "low-priority-half" or a "high-priority-half". The priority levels of the low-priority-half and high-priority-half are determined by the degraded quality if they are dropped. The low-priority-half and high-priority-half can be assigned a class according to the peak PME value of the segment. As there are four classes in MMS-PC model 1 and five classes in MMS-PC model 2, four priority levels exist for the low-priority-half and five priority levels exist for the high-priority-half respectively. So, in total, eleven priority levels exist in the priority-based delivery model.

Table 3 below describes the mapping between priority levels and the MMS-PC model class.

TABLE 3

Mapping Between Priority Level and MMS-PC Model Class

| Priority level | 11 | 10 | 9 | 8 | 7 | 6 | 5 | 4 | 3 | 2 | 1 |
|---|---|---|---|---|---|---|---|---|---|---|---|
| Frame type | I | P | B | B | B | B | B | B | B | B | B |
| MMS-PC Model |  |  | 2 | 2 | 2 | 2 | 2 | 1 | 1 | 1 | 1 |
| Class |  |  | 4 | 3 | 5 | 2 | 1 | 3 | 2 | 4 | 1 |

For example, the peak PME value of segment i is 7, so the low-priority-half is assigned priority level 1 and the high-priority-half is assigned priority level according to Tables 1 and 2. This is done in the following manner. Notice that the PME value of 7 corresponds to the first class in each of FIGS. 9 and 10. Notice also that the bottom row of Table 3 contains entries for each of the classes in each of the models. Specifically, for model 1 there are classes 1-4 and for model 2 there are classes 1-5. Since the above PME value corresponds to class 1 in each of the models, class 1 can be mapped to a priority level of 1 (for model 1) and 5 (for model 2). The priority levels of the low-priority-half and the high-priority-half of segment i−1 and i+1 are also determined by their peak PME values.

In FIG. 12, there are three segments within the delivery window. Under the constraints of available bandwidth, the frames with higher priority within a delivery window will be delivered. That is effectively equivalent to dropping frames with lower priorities. In this example, the frames of priorities higher than five are delivered, and the frames of priorities lower than six are dropped. In this priority-based delivery model, frames of lower importance to a viewer's perceived quality have lower priorities and frames of higher importance the viewer's perceived quality have higher priorities.

Perceptual Temporal Video Adaptation

Available bandwidth typically varies throughout delivery of a stream. The described perceptual temporal video adaptation scheme actively drops B frames and optimally utilizes available bandwidth and client buffer space such that video quality is improved and smoothed. An underlying principle behind active frame dropping is to actively drop unimportant frames and thus save bandwidth resources to the client buffer when bandwidth is stable. Thus, important frames are protected and the client buffer can be used as bandwidth decreases. The heart of active frame dropping is the same as active layer dropping in the above described FGS video streaming. The forward-shifting technique and content-aware decision making are utilized in the temporal video adaptation scheme.

Active frame dropping thus bridges the gap between the priority-based delivery model and optimal utilization of available bandwidth and client buffer space. When the bandwidth is stable, the client buffer is typically not full, and current B frames are of low priorities. These low priority B frames are then actively dropped to forward-shift the whole stream to the client buffer. When available bandwidth decreases and current frames are of high priorities, the client buffer is used so that the bandwidth decrease is hidden from the decoder and the video quality is improved and smoothed. As soon as bandwidth recovers again, the active frame dropping can be restarted to prepare for next bandwidth decrease. As a result, important B frames are protected and video quality is smoothed. In addition, active B frame dropping does not typically result in any start-delay.

Figure 13:
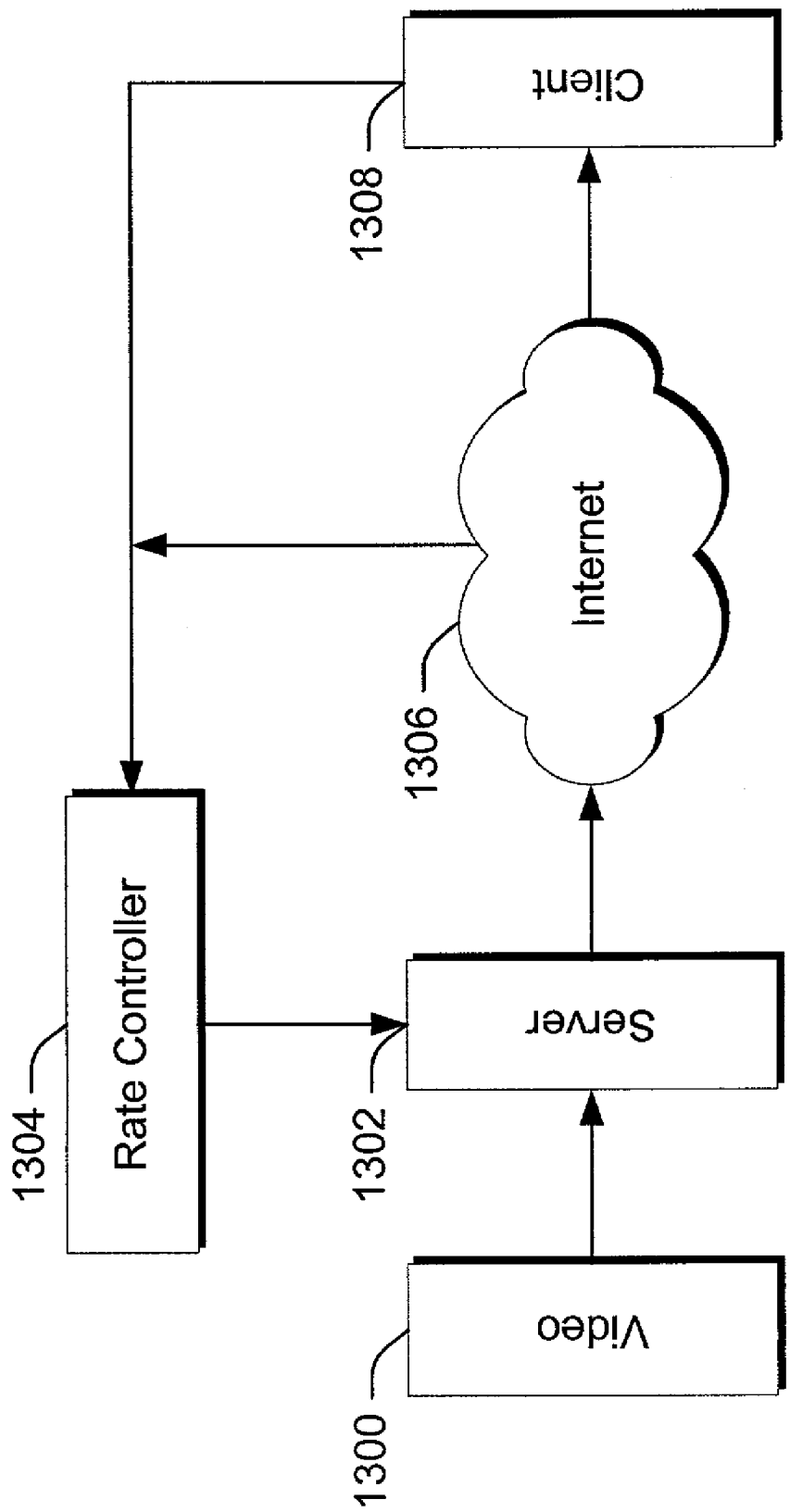
FIG. 13 is a block diagram of an exemplary system in accordance with one embodiment.

FIG. 13 shows a video streaming system that utilizes the Internet. The system includes video data 1300 that is received by a streaming server 1302 for streaming over the Internet 1306. The streaming server works under the influence of a rate controller 1304 which can control the rate at which video is streamed. A client 1308 receives streamed video over the Internet 1306. The rate controller 1304 can desirably receive feedback from the Internet 1306 and/or the client 1308. Server 1302 outputs the MPEG-4 base layer and the enhancement layer streams. The feedback from the client and/or the Internet is used to estimate the available bandwidth. Thereby, the rate at which the enhancement layer is sent can be dynamically controlled by the rate controller 1304 according to network conditions.

The embodiment described below focuses on the rate controller 1304. In the illustrated and described embodiment, rate controller 1304 is implemented as a close-loop, feedback rate control system.

Exemplary Rate Controller

Figure 14:
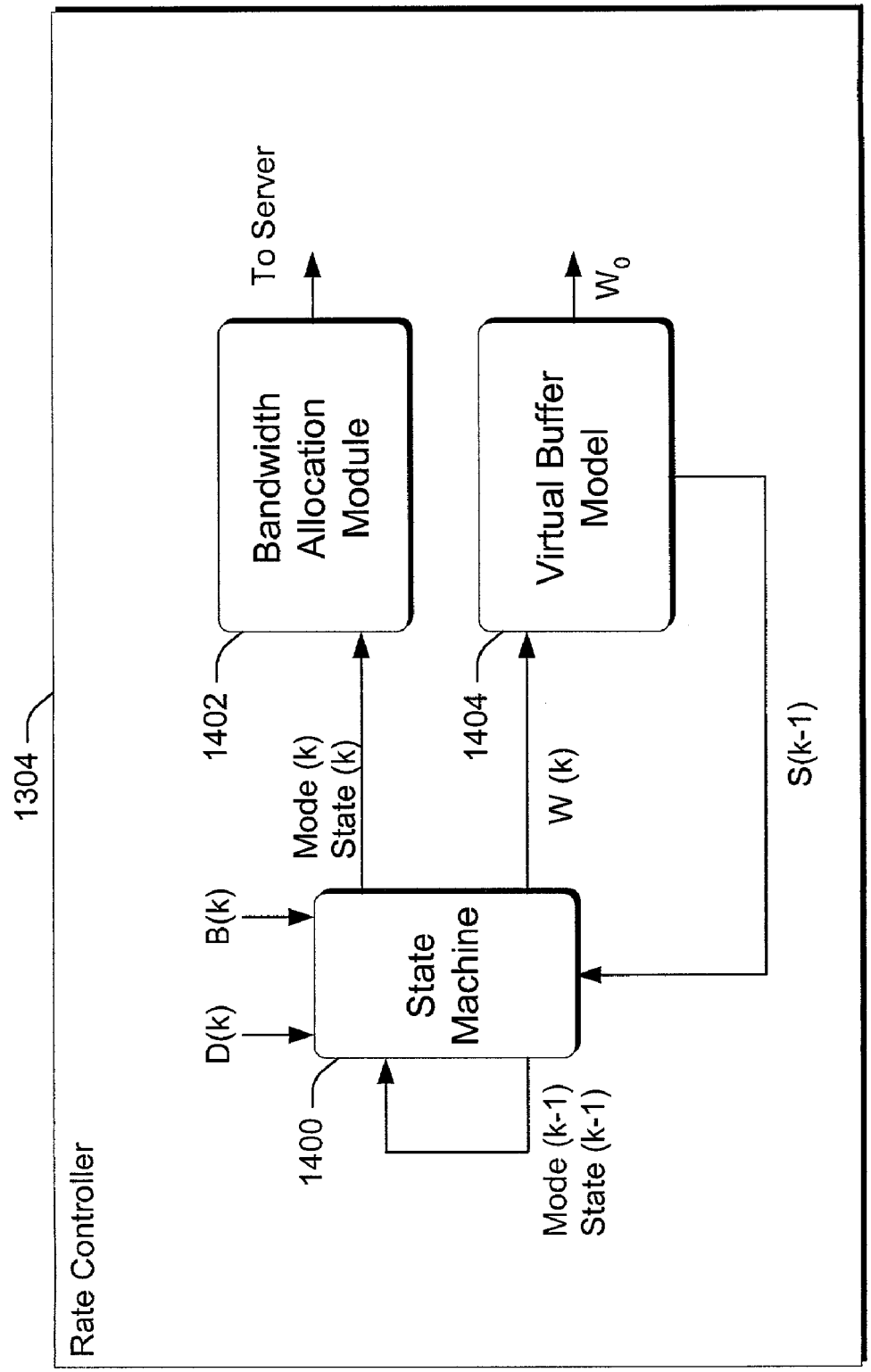
FIG. 14 is a block diagram of an exemplary rate controller in accordance with one embodiment.

FIG. 14 shows an exemplary rate controller 1304 in accordance one embodiment in additional detail. The illustrated rate controller comprises a state machine 1400, a bandwidth allocation module 1402, and a virtual buffer model 1404. The heart of the framework is the state machine 1400, which implements perceptual rate adaptation through mode and state transitions. Mode transitions are to be adapted to long-term bandwidth or bit-rate variations, and state transitions are to be adapted to short-term bandwidth or bit-rate variations.

Virtual buffer model 1404 is introduced to describe the dynamical buffer filling and draining process. A constant frame consumption rate is assumed in the buffer model. The buffer status is feedback to the state machine 1400 for smoothing. The bandwidth allocation module 1402 allocates bandwidth to delivered frames given the state and mode.

The following notations are utilized in the description that follows:

$W_0$: constant frame consumption rate.
$W(k)$: sliding window size at kth time slot.
$S_0$: client buffer capacity.
$S(k)$: number of buffered frames after kth time slot.
$Q(k)$: the first streamed frame at kth time slot.
$M$: number of priority levels, M=11

Mode(k): mode of state machine, Mode $(k) \in \{1,2,\ldots,11\}$.
State(k): state of state machine. State$(k) \in \{1,2,3\}$
$B(k)$: estimated available bandwidth.
$AB(k)$: average bandwidth until time slot $$k : AB(k) = \left( \sum_{k=1}^{k} B(k) \right) / k$$

$R_j^i$: for jth frame, its priority level is $i_0$ and its size is $L_0$, if $i=i_0$, then $R_j^i = L_0$, else $R_j^i = 0$
$L_k^i(j)$: for jth frame at kth time slot, its priority level is $i_0$ and its size is $L_0$, if $i=i_0$, then $L_k^i(j)$ $L_0$, else $L_k^i(j) = 0$
$T(n, k)$: number of frames that can be transmitted under mode n and available bandwidth. It is determined by $$B(k) = \sum_{i=n}^{i=M} \sum_{j=Q(k)}^{j=Q(k)+T(n,k)-1} L_k^i(j)$$

$E_k^i$: bit size of priority i of current $W(k)$ frames, so $$E_k^i \sum_{j=Q(k)}^{j=Q(k)+W(k)-1} L_k^i(j)$$

$QE_k^i$: bit size of priority i of current $W_0$ frames, so $$QE_k^i \sum_{j=Q(k)}^{j=Q(k)+W_0-1} L_k^i(j)$$

$P(n, k)$: bit size of frames that are protected in mode n with the window size $$W(k) : P(n, k) = \sum_{i=n}^{i=M} E_k^i$$

$QP(n,k)$: bit size of frames that would be protected if the window size is $$W_0 : QP(n, k) = \sum_{i=n}^{i=M} QE_k^i$$

$D(k)$: a priori information, including $R_j^i$, $L_k^i(j)$, $T(n,k)$, $E_k^i$, $QE_k^i$, $P(n,k)$, $QP(n,k)$, N, TP(i), etc.
N: number of total frames of the sequence.
TP(i): the average size of priority level i of the sequence:

$$TP(i) = \left( \sum_{j=1}^{N} R_j^i \right) / N$$

The Virtual Buffer Model

In the illustrated embodiment, virtual buffer model 1404 is modeled by a frame FIFO (First In, First Out) queue. The frame rate entering the buffer is $W(k)$, the constant frame consumption rate is $W_0$, and $S(k-1)$ is the number of frames buffered after time slot k−1. Accordingly, the filling rate is $W(k)-W_0$ and the draining rate is $W_0-W(k)$. The following equation holds:

$$S(k)=S(k-1)+(W(k)-W_0)$$

To avoid underflow: $W(k) \geq W_0-S(k-1)$
To avoid overflow: $W(k) \leq S_0+W_0-S(k-1)$ In this buffer model, underflow and overflow are in the sense of frame number, not in the sense of bit size. However, bit size and frame number are interchangeable. To make the following discussion simple, it is assumed that the client buffer size is large enough for any successive $S_0$ frames.

The State Machine

In the illustrated and described embodiment, state machine 1400 implements perceptual rate adaptation by mode and state transitions. A mode defines what priority levels are protected. The priority levels that are higher or equal to the current mode are protected. If bandwidth or stream bit-rate changes in the sense of long-term, mode transits to decrease or increase the priority level to be protected. Mode increases mean that less priority levels are protected and mode decreases mean that more priority levels are protected.

A state determines current delivery window size. Within each mode, state transits to absorb short-term bandwidth or stream bit-rate variations. When bandwidth decreases, buffered frames are used in addition to transmitted frames to provide a constant frame rate. When bandwidth recovers, unimportant frames are is actively dropped and more frames are forward-shifted to fill the client buffer.

Figure 15:
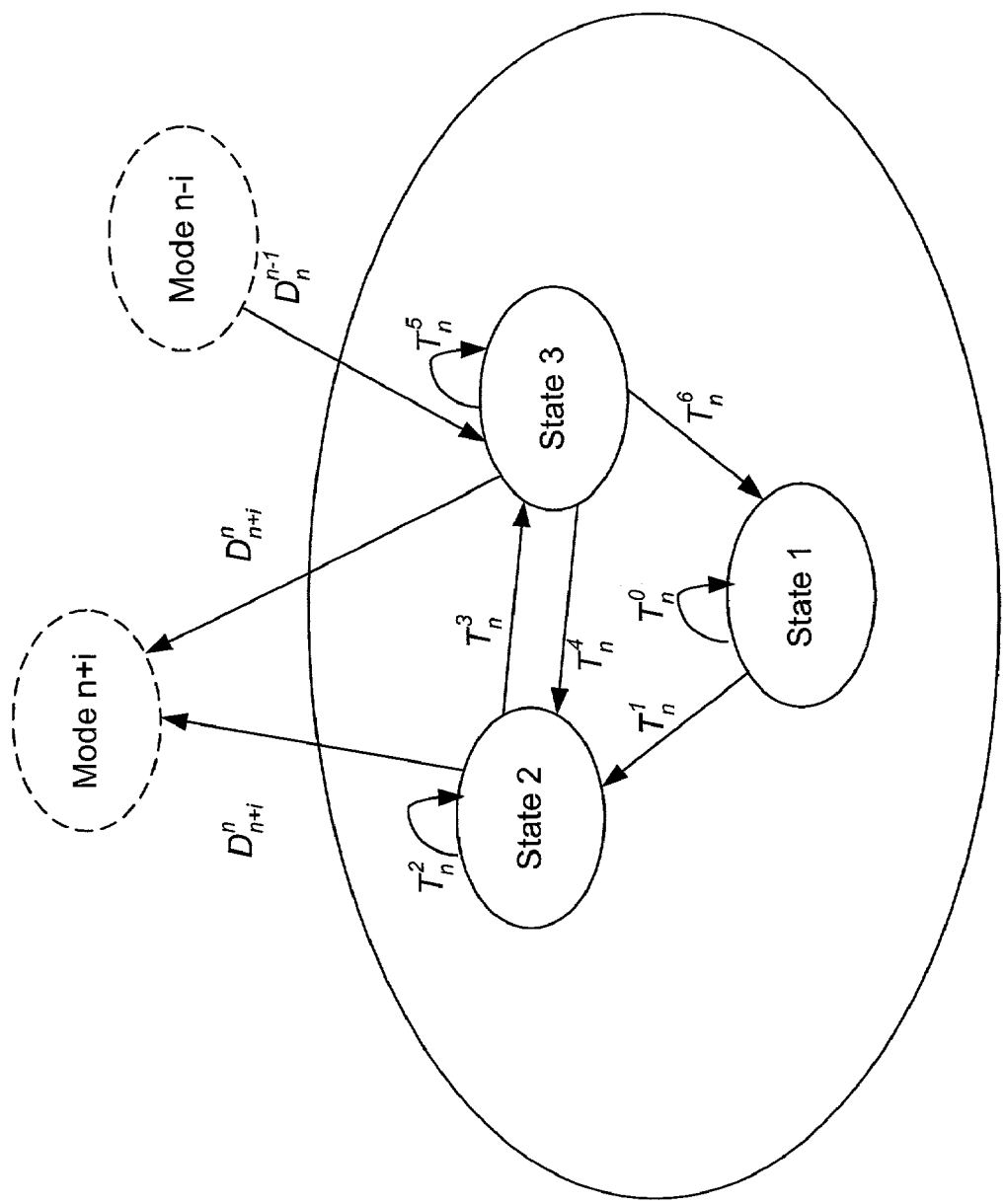
FIG. 15 is a state diagram in accordance with one embodiment.

State Transition FIG. 15 is a diagram that illustrates state and mode transitions in accordance with one embodiment. In this example, there are three states in the state machine 1400, namely, State 1, State 2, and State 3. A pair of window sizes $(\max(W_0-S(k-1),0), S_0+W_0-S(k-1))$ is declared to the state machine for a given time slot k. The left item of the pair declares the minimum frame number that the client buffer needs to avoid underflow. Similarly the right item declares the maximum frame number that the client buffer can accept to avoid overflow. The state machine 1400 can adjust its sending frame rate $W(k)$, called the sliding window here, from $\max(W_0-S(k-1),0)$ to $S_0+W_0-S(k-1)$. To make the rate controller 1304 more sustainable to bandwidth decreases and stream bit-rate increases, it is expected to keep $S(k-1)$ to be $S_0$ and $W(k)$ to be $W_0$. This is the stable state, called State 1, which the state machine will try to keep.

When bandwidth is insufficient for $W_0$ frames, $W(k)$ will be decreased and the state transits to State 2. In state 2, the buffer is used as additional bandwidth and, thus, insufficient bandwidth is hidden from the decoder. When the bandwidth recovers, the state transits to State 3. In this state, the window size $W(k)$ is maximized by actively dropping the frames that are not protected. So the buffer is filled again at this state. State 3 remains until the buffered frames are equal to $S_0$ again. By sliding the window, short-term bandwidth and stream bit-rate fluctuation is absorbed to provide a constant frame rate. Formula descriptions are as follows.

State 1: $W(k)=W_0$, $S(k)=S_0$ and $B(k) \geq QP(n,k)$
State 2: $P(n,k)=B(k)$, $B(k)<QP(n,k)$, $W(k)<W_0$, and $S(k)<S_0$ In state 2, all frames of priority lower than n are dropped.

State 3: $P(n,k)=B(k)$, $B(k) \geq QP(n,k)$, $W(k) \geq W_0$, and $S(k)<S_0$

In state 3, active dropping is performed and all frames of priority lower than n are dropped.

The state transmission conditions in FIG. 11 are as follows:

$T_n^0: B(k+1) \geq QP(n,k+1)$

Note: Bandwidth is sufficient to keep current state and mode.

$T_n^1: B(k+1)<QP(n,k+1)$

Note: Bandwidth insufficient, so decrease the sliding window.

$T_n^2: B(k+1)<QP(n,k+1)$ and $S(k)+T(n,k+1) \geq W_0$

Note: Bandwidth still insufficient, but client buffer not underflow $T_n^3: B(k+1) \geq QP(n,k+1)$ and $S(k)+T(n,k+1) \geq W_0$ Note: Bandwidth increase, so actively drop unprotected frames.

$T_n^4: B(k+1)<QP(n,k+1)$ and $S(k)+T(n,k+1) \geq W_0$

Note: Bandwidth decreases, decrease the sliding window.

$T_n^5: B(k+1) \geq QP(n,k+1)$ and $S(k)<S_0$

Note: Fill buffer by active dropping when bandwidth sufficient $T_n^6: B(k+1) \geq QP(n,k+1)$ and $S(k)=S_0$ Note: Client buffer full, return to stable state.

Mode Transition

The mode of the state machine is decided by so-called a priori information of the stream and average bandwidth. The current mode i is determined by $$\sum_{j=i-1}^{j=M} TP(j) > AB(k) \geq \sum_{j=i}^{j=M} TP(j)$$

So the mode of state machine will not change frequently and video quality is smooth. If long-term bandwidth variation occurs, mode transits to adapt to the variation. However, when the transmission of frames of priority levels higher than or equal to n cannot be guaranteed and constant frame rate consumption cannot be guaranteed, the state machine 1400 will immediately decrease the priority levels that are protected. As shown in FIG. 15, the condition of transition from mode n to mode n+i is $$D_{n+i}^n: S(k)+T(n,k+1)<W_0$$

where i satisfies: $QP(n+i-1,k+1)>B(k) \geq QP(n+i,k+1)$.

Bandwidth Allocation

Given the current mode Mode(k) and state State(k), available bandwidth is allocated to delivered frames. For the three states, the frames whose priorities are higher or equal to Mode(k) are all transmitted. Specifically, for state 1, extra bandwidth $B(k)-QP(Mode(k),k)$ is allocated to the frames with the highest priority. The frames are delivered in a frame-by-frame order along the time axis as shown in FIG. 12. The reasons are twofold. First, the newly transmitted frames may be consumed during the current time slot. Therefore, buffering efficiency can be increased. Second, the frame-by-frame order does not need any synchronization at the client side and simplifies system realization.

Simulation Examples

A two-state Markov model, as proposed by Yee and Weldon, in "Evaluation of the performance of error correcting codes on a Gilbert channel", IEEE Trans. Comm. Vol. 43, No. 8, pps. 2316-2323 (1995) is used to simulate packet losses in the Internet channel.

In the simulation described below, a simplified model is used, so the average packet loss rate is $$p = \frac{(1-\alpha)}{1-\alpha+1-\beta} \quad (6)$$

Figure 16:
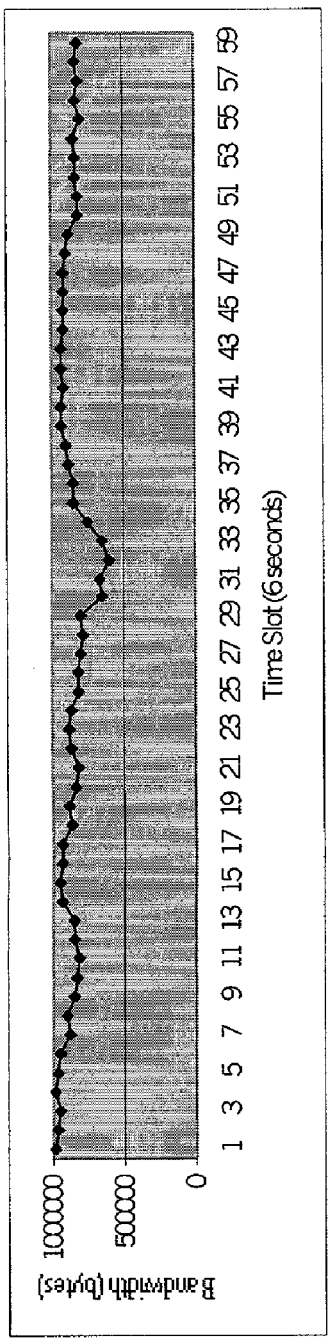
FIGS. 16 and 17 are diagrams of exemplary bandwidth curves.
Figure 17:
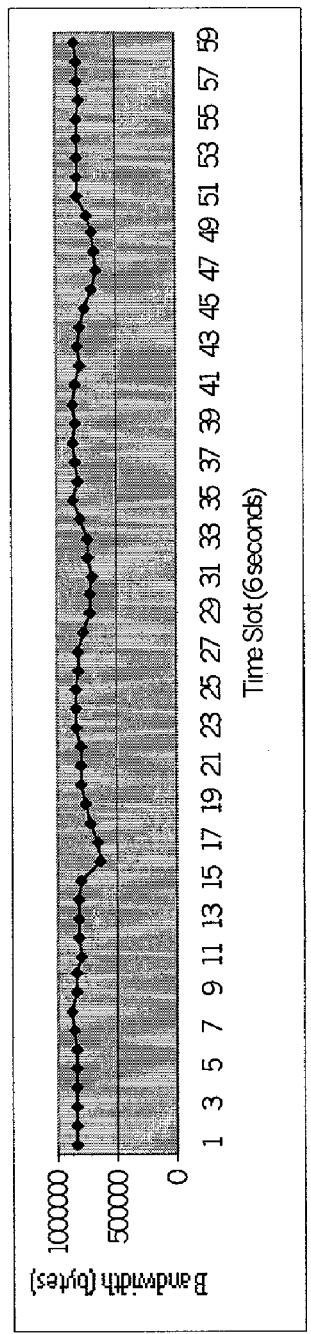

Details of the model can be found in Yee and Weldon referenced above. Assuming that the transport protocol is TCP-friendly, an equation-based way to estimate available bandwidth is used, such as the one described in Floyd, et al., "Equation-Based Congestion Control for Unicast Applications", SIGCOMM 2000, February 2000. The equation is $$T = \frac{s}{R\sqrt{\frac{2p}{3}} + t_{RTO}\left(3\sqrt{\frac{3p}{8}}\right)p(1+32p^2)} \quad (7)$$

Where s is the size of the packet, R is the round-trip time, $t_{RTO}$ is the timeout value, and p is the packet loss rate. Other details are described in Floyd et al. referenced above. The bandwidth curve shown in FIG. 16 and FIG. 17 are chosen from realizations of the stochastic process characterized by the model.

The coding type and the GOP structure of the test sequences are the same as the video library. Two sequences, $S_1$ and $S_2$, are selected from our video library. The TP(i) of the two sequences is shown in Table 4. Other parameter settings are in Table 5.

TABLE 4

TP(i) of the two sequences (bytes)

| i  | 1      | 2 | 3      | 4     | 5     | 6     | 7 | 8      | 9     | 10     | 11     |
|----|--------|---|--------|-------|-------|-------|---|--------|-------|--------|--------|
| S1 | 132150 | 0 | 97500  | 10050 | 57000 | 75750 | 0 | 99150  | 10050 | 32950  | 255600 |
| S2 | 67350  | 0 | 154650 | 14100 | 43200 | 25050 | 0 | 156150 | 14250 | 339300 | 252450 |

TABLE 5

Parameter Settings

| $W_0$: 150 | $S_0$: 300 | Timeslot: 6 seconds (150 frames) |
|---|---|---|
| S(0): 50 | R: 0.011 sec | β: 0.911 |
| $t_{RTO}$: 0.1 sec | α: 0.999 | |

Simulation Results

FIGS. 18 and 19 show behaviors of the state machine under the bandwidth curve 1. FIG. 18a and FIG. 19a show the mode transitions of the state machine. It can be seen that frames of priority levels higher than 4 are all protected. At the same time, the mode curve is a straight line, that is, the video quality is smooth throughout the whole delivered sequence. FIG. 18b and FIG. 19b show the state transition curves. When bandwidth decreases, the state transits to State 2 such that less frames are sent and the client buffer is used as bandwidth. When bandwidth recovers, the state transits to State 3 to forward-shift more frames and the client buffer is filled again. In normal conditions, the state remains in stable State 1. FIG. 18c and FIG. 19c show the window size, which changes according to the current state. In State 1, the window size is $W_0$. In State 2, the window size is smaller than $W_0$, and in State 3, the window size is larger than $W_0$. FIG. 18d and FIG. 19d show client buffer fullness. Notice that the fullness changes according to the window size. Similarly, FIGS. 20 and 21 show behaviors of the state machine under the bandwidth curve 2.

From these simulations, we can see that frames of more importance to human perception are protected in case of sharp bandwidth decrease, and the overall video quality is improved and smoothed. The proposed rate controller can realize active frame dropping and absorb short-term bandwidth fluctuations through state transitions. As a result, a priori information about the video stream, available bandwidth, and client buffer are optimally utilized.

CONCLUSION

In the embodiments described above, MMS-PC models are presented that can predict user satisfaction with regard to frame dropping by low-level features. A priority-based delivery model is constructed based on the models. A perceptual video adaptation scheme is then developed, which actively drops B frames according to the priority-based delivery, and optimally utilizes available bandwidth and client buffers. A state machine realizes the adaptation scheme. State transitions or mode transitions of the state machine absorb short-term or long-term bandwidth and bit-rate variations. The result of the above systems and methods can be improved video quality and smoothness.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
providing a streaming server configured to stream data to at least one client, said data comprising one or more enhancement layers;
determining whether portions of the one or more enhancement layers are important by taking into account motion that is embodied in said portions, the determining comprising:
computing perceived motion energy (PME) values for multiple B frames of a video stream;
taking the product of an average of motion vector magnitudes within a frame and a percentage of dominant motion direction;
representing the video stream as a PME value sequence;
segmenting the PME value sequence into individual segments, each segment corresponding to multiple frames;
within each segment, assigning one or more priority levels; and making a decision to drop enhancement layer portions based, at least in part, on whether the portions are important dropping frames having lower priorities when available bandwidth decreases.

2. The method of claim 1, wherein the PME values reflect a degree of perceived motion judder if a frame is dropped.

3. The method of claim 1, wherein the multiple frames comprise B frames.

4. The method of claim 1, wherein said segmenting comprises using a model to detect patterns in the PME value sequence so that the detected patterns can be segmented into individual segments.

5. The method of claim 4, wherein said model comprises a triangle model.

6. A method comprising:
computing perceived motion energy (PME) values for multiple frames of a video stream by taking the product of an average of motion vector magnitudes within a frame and a percentage of dominant motion direction;
representing the video stream as a PME value sequence;
segmenting the PME value sequence into individual segments, each segment corresponding to multiple frames;
within each segment, assigning one or more priority levels; and
dropping frames having lower priorities when available bandwidth decreases.

7. The method of claim 6, wherein the PME values reflect a degree of perceived motion judder if a frame is dropped.

8. The method of claim 6, wherein the multiple frames comprise B frames.

9. The method of claim 6, wherein said segmenting comprises using a model to detect patterns in the PME value sequence so that the detected patterns can be segmented into individual segments.

10. The method of claim 9, wherein said model comprises a triangle model.

11. The method of claim 10, wherein left bottom vertices of the model represent starting points of individual segments, right bottom vertices of the model represent end points of individual segments, and top vertices of the model represent maximum PME values of individual segments.

12. The method of claim 6, wherein said segmenting comprises, prior to using the model, splitting one or more portions of the PME value sequence that correspond to continuous motion by defining splitting boundaries relative to the PME value sequence.

13. The method of claim 6, wherein said assigning of the priority levels takes place by considering degraded quality if frames are dropped.

14. The method of claim 6 further comprising dropping frames with lower priority levels when bandwidth is constant to forward shift frames that are not dropped.

15. The method of claim 6, wherein said assigning of the priority levels comprises assigning individual B frame portions a class in accordance with the peak PME value of its associated segment, wherein any one class is associated with one or more models that provide a mapping between classes and individual priority levels.

* * * * *